United States Patent
Fujita et al.

(10) Patent No.: US 10,501,121 B2
(45) Date of Patent: Dec. 10, 2019

(54) ROTATION ANGLE DETECTOR

(71) Applicant: DENSO CORPORATION, Kariya, Aichi-pref. (JP)

(72) Inventors: Toshihiro Fujita, Kariya (JP); Hideki Kabune, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 277 days.

(21) Appl. No.: 15/158,232

(22) Filed: May 18, 2016

(65) Prior Publication Data

US 2016/0339958 A1 Nov. 24, 2016

(30) Foreign Application Priority Data

May 20, 2015 (JP) ................. 2015-102809

(51) Int. Cl.
*H02J 7/14* (2006.01)
*B62D 15/02* (2006.01)
*G01D 5/14* (2006.01)
*H02P 6/16* (2016.01)

(52) U.S. Cl.
CPC ....... *B62D 15/0235* (2013.01); *B62D 15/021* (2013.01); *G01D 5/145* (2013.01); *H02P 6/16* (2013.01)

(58) Field of Classification Search
CPC .... B62D 5/0463; B62D 5/0481; B62D 5/049; B62D 15/025; B62D 5/046; B62D 5/0466; B62D 5/0487; H02P 29/0241; H02P 29/032; G01R 33/09
See application file for complete search history.

(56) References Cited

U.S. PATENT DOCUMENTS

| 7,667,341 B2* | 2/2010 | Serdynski | F02B 63/04 290/30 A |
|---|---|---|---|
| 8,319,492 B2 | 11/2012 | Schmidt et al. | |
| 2005/0285446 A1 | 12/2005 | Yamashita et al. | |
| 2008/0303513 A1* | 12/2008 | Turner | G01P 3/488 324/160 |
| 2011/0309680 A1* | 12/2011 | Oleksiewicz | B60R 16/033 307/66 |
| 2014/0277894 A1* | 9/2014 | Doyle | G01C 21/3407 701/23 |

FOREIGN PATENT DOCUMENTS

| JP | S63-242028 | | 10/1988 | |
|---|---|---|---|---|
| JP | H10-73458 | | 3/1998 | |
| JP | 2012-046047 | * | 8/2010 | ............... B62D 5/04 |
| JP | 2012-46047 | | 3/2012 | |
| JP | 5339094 B2 | | 11/2013 | |

* cited by examiner

*Primary Examiner* — Alesa Allgood
(74) *Attorney, Agent, or Firm* — Knobbe, Martens, Olson & Bear, LLP

(57) ABSTRACT

A rotation angle detector includes a voltage detector receiving a supply of voltage from a first power source and detecting a motor rotation regarding a motor, the motor rotation more specifically detected as (i) a rotation angle of the motor and (ii) a number of rotations of the motor. Also, a second power source is disposed separately from the first power source and supplying voltage to the voltage detector. Thus, even when the voltage of the in-vehicle battery lowers or the voltage supply therefrom is interrupted, the voltage supply to a voltage detector is continuous from the power storage device, thereby enabling a continuous detection of the rotation angle and the rotation number of the motor.

14 Claims, 15 Drawing Sheets

ROTATION ANGLE DETECTOR

CROSS REFERENCE TO RELATED APPLICATION

The present application is based on and claims the benefit of priority of Japanese Patent Application No. 2015-102809, filed on May 20, 2015, the disclosure of which is incorporated herein by reference.

TECHNICAL FIELD

The present disclosure generally relates to a rotation angle detector for detecting a rotation angle.

BACKGROUND INFORMATION

Generally, a rotation angle detector is realized as an angle sensor disclosed in, for example, a patent document, Japanese Patent No. 5339094 (Patent document 1) shown below. This angle sensor is a sensor used in the electric power steering device, and detects a steering angle of the steering wheel. The angle sensor is provided with a motor rotation angle sensor for detecting a rotation angle and the number of rotations of a motor in the electric power steering device. The steering angle of the steering wheel is then calculated from the detection result of the motor rotation angle sensor. When a supply of voltage from an in-vehicle battery to the motor rotation angle sensor is continued even during an ignition switch OFF time, the steering angle, or more precisely, a change of the steering angle, of the steering wheel is continuously detectable.

In terms of vehicle control, the steering angle of the steering wheel needs to be detectable only during an ignition switch ON time. Therefore, during the ignition switch OFF time, only the number of rotations of the motor needs to be detectable. Further, the supply of voltage from the in-vehicle battery to the motor rotation angle sensor is configured to be intermittent for power-saving purposes. However, such an intermittent supply of voltage may cause an inaccurate rotation number sensing (e.g., the sensing of the rotation number may become intermittent and may yield a discontinuously false sensing result). In other words, by increasing the operation frequency of (i.e., the power supply frequency to) the motor rotation angle sensor, the sensing accuracy may be improved, but the power consumption may also be increased at the same time.

In view of the above situation, a steering angle detector for detecting a steering angle of a steering wheel in an electric power steering device is proposed, which is equipped with (i) a rotation angle detection section for detecting a rotation angle in the electric power steering device and (ii) a rotation number detection section for detecting a number of rotations of the motor in the electric power steering device.

During an ignition switch ON time, the voltage supply is provided from the in-vehicle battery to the rotation angle detection section, and regardless of the ignition switch ON-OFF, the voltage supply is provided from the in-vehicle battery to the rotation number detection section. In such configuration, the rotation angle detection section receives the voltage supply only during the ignition switch ON time, thereby achieving a more limited operation of the detection section, in comparison to the configuration of the patent document 1. That is, the power consumption of the steering angle detector is further reduced in such circuit configuration, while limiting the operation of the steering angle detector.

However, with the above-described steering angle detector, the voltage supply from the in-vehicle battery to the rotation number detection section is continued regardless of the ON or OFF positions of the ignition switch. Thus, in case of lowering or interruption of the voltage supply from the in-vehicle battery, the rotation number detection section of the steering angle detector cannot detect the number of rotations of the motor in the electric power steering device. Therefore, if the steering wheel is operated in such a situation (i.e., during a voltage supply lowering/interruption period), the steering angle of the steering wheel cannot be accurately detected.

SUMMARY

It is an object of the present disclosure to provide a rotation angle detector that is capable of continuously detecting a motor rotation number in case of lowering or interruption of the voltage supply from a first power source.

In addressing the above-described issue, the present disclosure proposes a rotation angle detector a voltage detector receiving a supply of voltage from a first power source and detecting a motor rotation regarding a motor, the motor rotation more specifically detected as (i) a rotation angle of the motor and (ii) a number of rotations of the motor, and a second power source disposed separately from the first power source and supplying voltage to the voltage detector.

In such a configuration, the second power source is provided separately from the first power source for the voltage supply to the detection section. Therefore, even in case that the voltage supply to the detection section is lowered or interrupted, the motor rotation number is continuously detectable.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Embodiments of the present disclosure are described below in more details. In those embodiments, an application of the present disclosure regarding the rotation angle detector to the electric power steering device is described.

First Embodiment

Figure 1:
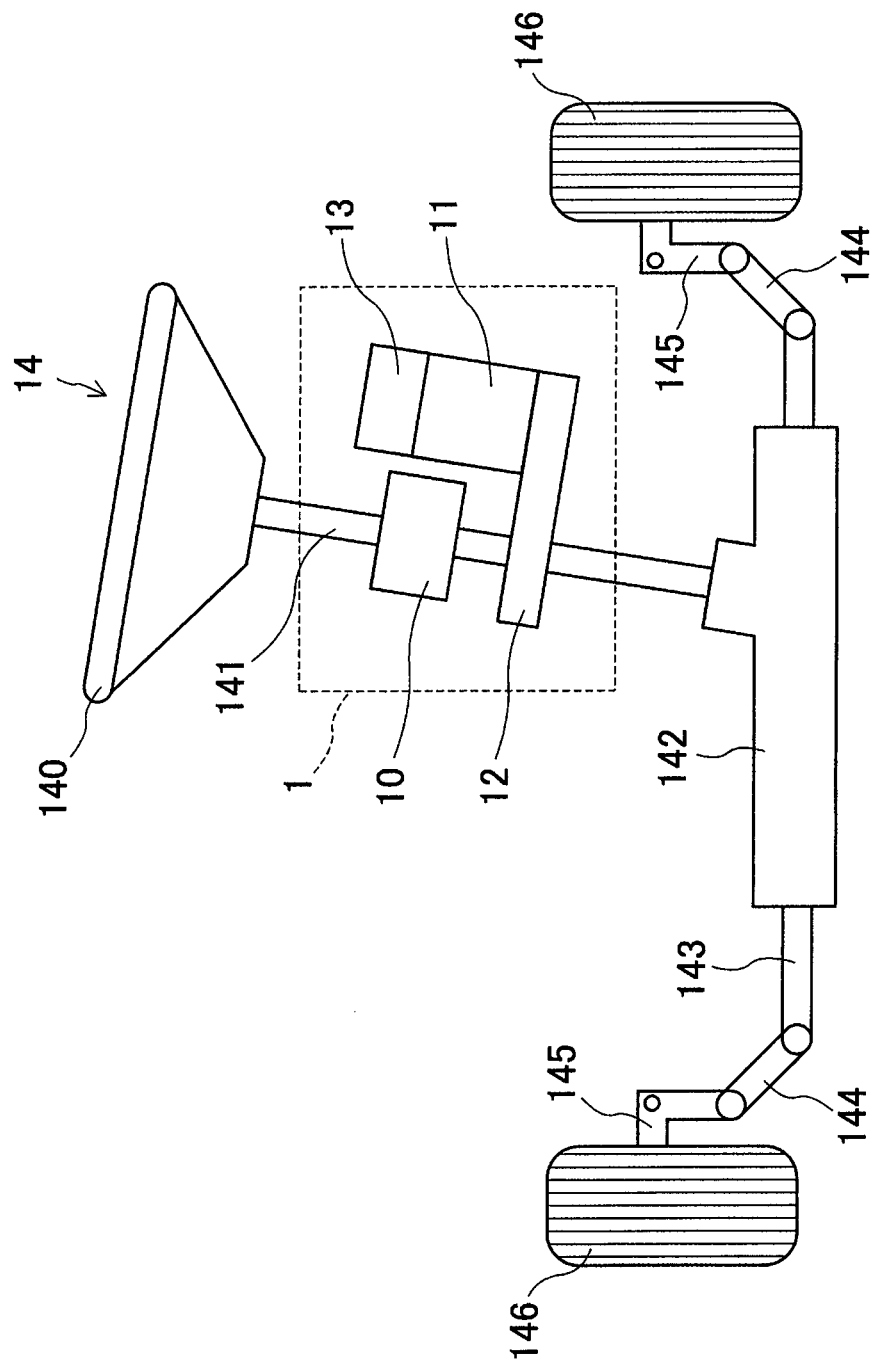
FIG. 1 is an illustration diagram of an electric power steering device and a steering system in a first embodiment of the present disclosure.
Figure 2:
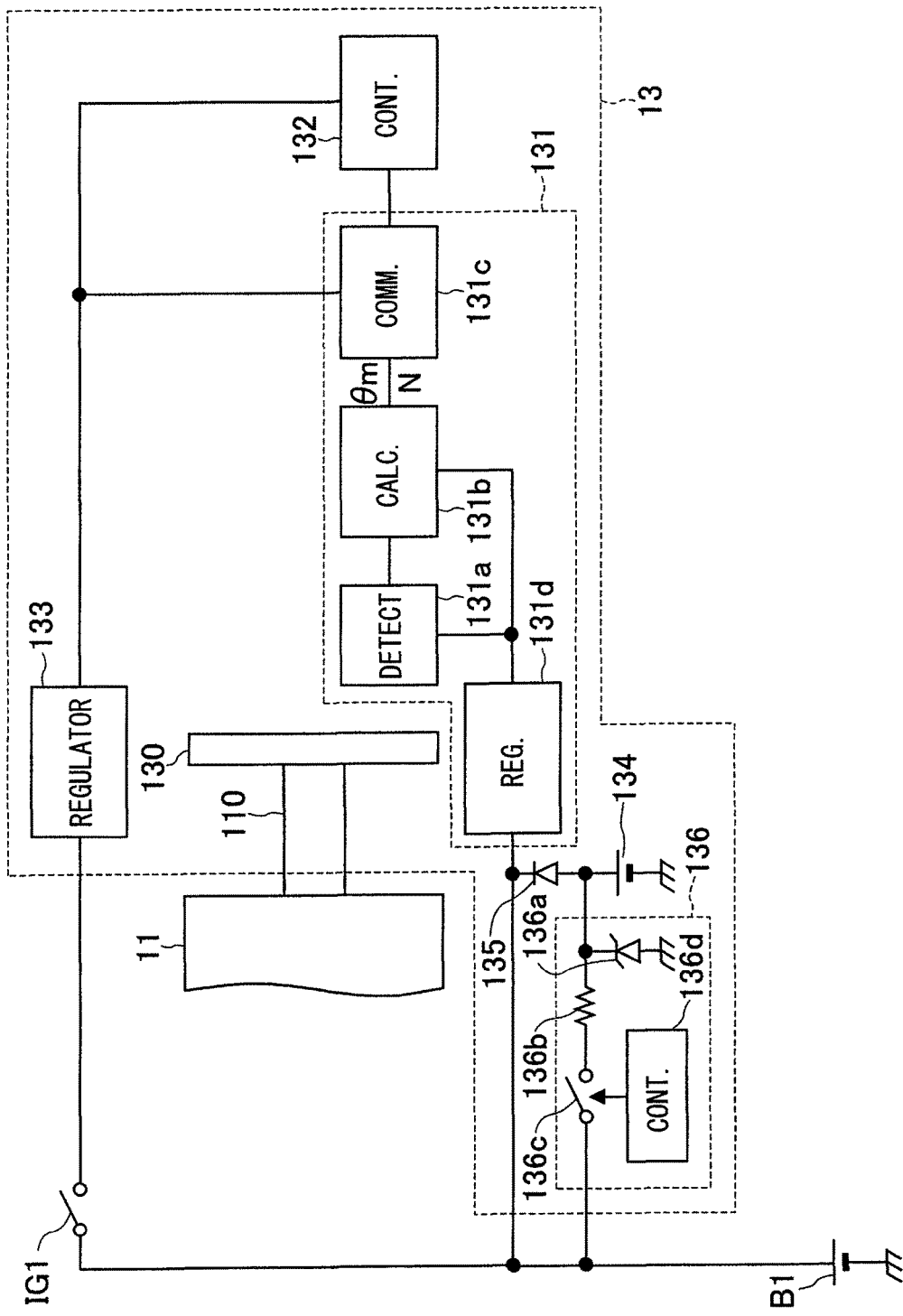
FIG. 2 is a circuit diagram of a rotation angle detector shown in FIG. 1.

First, with reference to FIGS. 1 and 2, the configuration regarding the electric power steering device and the steering system of the first embodiment is described.

An electric power steering device 1 shown in FIG. 1 is a device that generates a torque for assisting a steering operation of a steering wheel in a steering system.

The electric power steering device 1 is provided with a torque sensor 10, a motor 11, a speed reduction gear 12, and a rotation angle detector 13.

A steering system 14 is provided with a steering wheel 140, a steering shaft 141, a steering gear box 142, a rack 143, a tie rod 144, a steering knuckle arm 145, and a wheel 146.

The steering wheel 140 is fixed to one end part of the steering shaft 141. The pinion gear (not illustrated) is fixed to the other end of the steering shaft 141. The pinion gear engages the rack 143 that is accommodated in the steering gear box 142. The wheel 146 equipped with a tire is rotatably attached to both ends of the rack 143 via tie rod 144 and the steering knuckle arm 145.

The torque sensor 10 is a sensor that detects the steering torque of the steering wheel 140. The torque sensor 10 is disposed on the steering shaft 141.

The motor 11 is a device that generates a torque for assisting the steering operation of the steering wheel 140. The motor 11 generates a torque by receiving a supply of the three-phase alternating current (AC) according to a rotation angle θm of the motor 11.

The speed reduction gear 12 is a device that slows down the rotation of the motor 11 and transmits the generated torque to the steering shaft 141. The speed reduction gear 12 is disposed on the steering shaft 141. The motor 11 is disposed on the speed reduction gear 12, and transmits the torque to the steering shaft 141 via the speed reduction gear 12.

The rotation angle detector 13 is a device that detects a steering angle θstr of the steering wheel 140 while detecting the rotation angle θm of the motor 11.

As shown in FIG. 2, the rotation angle detector 13 is provided with a magnet 130, a detection section (i.e., a detector or a voltage detector) 131, a control unit (i.e., a controller) 132, a regulator 133, a power storage device 134, a capacitor 135, and a charger 136.

The magnet 130 is a tabular component that generates a magnetic field for detecting the rotation angle θm of the motor 11, and the number of rotations N of the motor 11. The magnet 130 has the magnetic poles on the surface, and is fixed to the end of the shaft 110 of the motor 11.

The detection section 131 receives a supply of the voltage from an in-vehicle battery B1 regardless of ON and OFF of an ignition switch IG1, for an operation of a part of the detection section 131, and also receives a supply of the voltage from the power storage device 134 via the capacitor 135, for an operation of a part of the detection section 131, which makes the detection section 131 serve as a function block that detects the rotation angle θm of the motor 11 and the number of rotations N of the motor 11.

Further, when the ignition switch IG1 is turned ON, the remaining part of the detection section 131 operates by receiving a supply of the voltage from the regulator 133, and serves as a function block that outputs the detected rotation angle θm of the motor 11 and the detected number of rotations N of the motor 11.

The detection section 131 has a detect element 131a, a calculation part 131b, a communications part 131c, and a regulator 131d.

The detect element 131a operates, regardless of ON and OFF of the ignition switch IG1, by receiving a supply of the voltage from the in-vehicle battery B1 via the regulator 131d, and also operates by receiving a supply of the voltage from the power storage device 134 via the capacitor 135 and the regulator 131d, to serve as an element that detects the rotating magnetic field of the magnet 130. That is, the detect element 131a is an element that detects information corresponding to the rotation angle of the motor 11.

The detect element 131a is disposed at a preset distance from the surface of the magnet 130 having the magnetic poles. The detect element 131a has its voltage input terminal connected to the regulator 131d, and has its output terminal connected to the calculation part 131b, respectively.

The calculation part 131b operates, regardless of ON and OFF of the ignition switch IG1, by receiving a supply of the voltage from the in-vehicle battery B1 via the regulator 131d, and also operates by receiving a supply of the voltage from the power storage device 134 via the capacitor 135 and the regulator 131d, to serve as a function block that calculates and outputs the rotation angle θm of the motor 11, and the number of rotations N of the motor 11 based on the detection result of the detect element 131a.

The calculation part 131b has its voltage input terminal connected to the regulator 131d, and has its input terminal connected to the output terminal of the detect element 131a, and has its output terminal connected to the communications part 131c, respectively.

The communications part 131c operates by receiving a supply of the voltage from the in-vehicle battery B1 via the regulator 133 when the ignition switch IG1 is turned ON, and transmits, as a function block, the rotation angle θm of the motor 11 and the number of rotations N that are inputted from the calculation part 131b by serial communications.

The communications part 131c has its voltage input terminal connected to the regulator 133, has its input terminal connected to the output terminal of the calculation part 131b, and has its output terminal connected to the control unit 132, respectively.

The regulator 131d is an element that converts, regardless of ON and OFF of the ignition switch IG1, the voltage of the in-vehicle battery B1 to a preset voltage, and supplies the converted voltage to the detect element 131a and to the calculation part 131b.

When the voltage of the in-vehicle battery B1 lowers or the voltage supply from the battery B1 is interrupted, the regulator 131d also serves as an element that converts the voltage of the power storage device 134 supplied via the capacitor 135 to the preset voltage, and supplies the converted voltage to the detect element 131a and to the calculation part 131b.

The regulator 131*d* has its input terminal connected to a plus terminal of the in-vehicle battery B1, and to the capacitor 135. The output terminal of the regulator 131*d* is connected to the detect element 131*a*, and to the calculation part 131*b*.

The control unit 132 operates by receiving a supply of the voltage from the in-vehicle battery B1 via the regulator 133 when the ignition switch IG1 is turned ON, and calculates, as a function block, a rotation angle of the steering shaft 141 (i.e., the steering angle θstr of the steering wheel 140) based on (i) the rotation angle θm of the motor 11 and the number of rotations N that are received from the communications part 131*c*, and (ii) the speed reduction ratio of the speed reduction gear 12 set up in advance.

Further, the control unit 132 controls the motor 11 based on the rotation angle θm of the motor 11 received from the communications part 131*c*, the steering torque of the steering wheel 140 inputted from the torque sensor 10, and the calculated steering angle θstr of the steering wheel 140.

The control unit 132 has its voltage input terminal connected to the regulator 133, and has its input terminal connected to the output terminal of the communications part 131*c*, respectively.

The regulator 133 is an element that converts the voltage of the in-vehicle battery B1 to a preset voltage, when the ignition switch IG1 is turned ON, and supplies the converted voltage to the communications part 131*c* and to the control unit 132.

The regulator 133 has its input terminal connected to the plus terminal of the in-vehicle battery B1 via the ignition switch IG1, and the minus terminal of the battery B1 is connected to the ground. The output terminal of the regulator 133 is connected to the voltage input terminal of the communications part 131*c* and to the control unit 132, respectively.

The power storage device 134 is a power source that supplies the voltage to the detect element 131*a* and to the calculation part 131*b* via the capacitor 135 and the regulator 131*d*, and the power storage device 134 is a chargeable, separate power source separately disposed from the in-vehicle battery B1. Specifically, the power storage device 134 is a battery that is chargeable.

The electric power storage capacity of the power storage device 134 at least enables, for a required time period that is required for a replacement of the in-vehicle battery B1, a continuous voltage supply to the detect element 131*a* and to the calculation part 131*b*. The power storage device 134 has its plus terminal connected to the input terminal of the regulator 131*d* via the capacitor 135, and connected to the charger 136; and has its minus terminal connected to the ground.

The charger 136 is a function block that is connected to the in-vehicle battery B1, supplies the electric power to the power storage device 134 from the in-vehicle battery B1, and charges the power storage device 134.

The in-vehicle battery B1, which is chargeable, is charged by receiving the electric power from an alternator (not illustrated), when the ignition switch IG1 is turned ON, and the engine (not illustrated) of the vehicle is started. That is, when the ignition switch IG1 is in an ON state, and the electric power is supplied to the in-vehicle battery B1 from the alternator, the charger 136 supplies the electric power to the power storage device 134 from the in-vehicle battery B1, and charges the power storage device 134.

However, when the ignition switch IG1 is in an OFF state, the engine stops, the electric power is not supplied to the in-vehicle battery B1 from the alternator, and the charger 136 does not charge the power storage device 134.

The charger 136 is provided with a Zener capacitor 136*a*, a resistor 136*b*, a switch 136*c*, and a control unit 136*d*.

While the cathode of the Zener capacitor 136*a* is connected to the plus terminal of the in-vehicle battery B1 via the resistor 136*b* and the switch 136*c*, it is also connected to the plus terminal of the power storage device 134, and the anode of the capacitor 136*a* is connected to the ground.

The control unit 136*d* is a function block that controls the switch 136*c*, and is connected to the control terminal of the switch 136*c*.

When the ignition switch IG1 is in an ON state and the electric power is supplied to the in-vehicle battery B1 from the alternator, the control unit 136*d* switches the switch 136*c* to the ON state, and charges the power storage device 134.

However, when the ignition switch IG1 is in an OFF state, and the electric power is not supplied to the in-vehicle battery B1 from the alternator, the control unit 136*d* switches the switch 136*c* to the OFF state, and does not charge the power storage device 134.

Next, with reference to FIGS. 1 and 2, an operation of the electric power steering device 1 of the first embodiment is described.

When the ignition switch IG1 is turned ON in FIG. 2, the regulator 133 converts the voltage of the in-vehicle battery B1 to a preset voltage, and supplies the converted voltage to the voltage input terminal of the communications part 131*c* and to the control unit 132.

On the other hand, regardless of ON and OFF of the ignition switch IG1, the voltage is supplied to the voltage input terminal of the detect element 131*a* and the calculation part 131*b* from the in-vehicle battery B1 via the regulator 131*d*.

The detect element 131*a* operates by receiving a supply of the voltage to the voltage input terminal from the in-vehicle battery B1, via the regulator 131*d*, and detects the rotating magnetic field of the magnet 130.

The calculation part 131*b* operates by receiving a supply of the voltage to the voltage input terminal from the in-vehicle battery B1 via the regulator 131*d*, and calculates and outputs the rotation angle θm of the motor 11 and the number of rotations N of the motor 11, based on the detection result of the detect element 131*a*.

The communications part 131*c* operates by receiving a supply of the voltage to the voltage input terminal from the in-vehicle battery B1 via the regulator 133, and transmits the rotation angle θm and the number of rotations N that are inputted from the calculation part 131*b* by serial communications.

The control unit 132 operates by receiving a supply of the voltage to the voltage input terminal from the in-vehicle battery B1, via the regulator 133.

The steering angle θstr of the steering wheel 140 is calculated based on the rotation angle θm and the number of rotations N of the motor 11 that are received from the communications part 131*c*, and the speed reduction ratio of the speed reduction gear 12 set up in advance.

Then, the motor 11 is controlled based on the rotation angle θm, the steering torque of the steering wheel 140 inputted from the torque sensor 10, and the calculated steering angle θstr.

Thereby, the steering operation of the steering wheel 140 is assisted in the steering system 14 of FIG. 1.

When the ignition switch IG1 is turned OFF in FIG. 2, the regulator 133 stops the voltage supply to the communications part 131*c*, and to the control unit 132.

On the other hand, regardless of ON and OFF of the ignition switch IG1, the voltage is supplied to the voltage input terminals of the detect element 131a and the calculation part 131b, from the in-vehicle battery B1 via the regulator 131d.

The communications part 131c and the control unit 132 stop the operation, since the voltage is no longer supplied to the voltage input terminals of the communications part 131c and the control unit 132 from the in-vehicle battery B1 via the regulator 133.

The detect element 131a operates continuously by receiving a supply of the voltage to the voltage input terminal from the in-vehicle battery B1 via the regulator 131d, and detects the rotating magnetic field of the magnet 130.

The calculation part 131b operates continuously by receiving a supply of the voltage to the voltage input terminal from the in-vehicle battery B1 via the regulator 131d, and calculates and outputs the rotation angle $\theta m$ of the motor 11, and the number of rotations N of the motor 11 based on the detection result of the detect element 131a.

Therefore, even when the steering wheel 140 is steered before the ignition switch IG1 is turned ON again, the calculation of the rotation angle $\theta m$ of the motor 11 and the number of rotations N of the motor 11 accompanying the steering operation of the steering wheel 140 is continued. Thus, when the ignition switch IG1 is turned ON again, an accurate steering angle $\theta str$ of the steering wheel 140 is detectable.

When the in-vehicle battery B1 is removed from the vehicle for a replacement, the voltage is no longer supplied to the voltage input terminals of the detect element 131a and the calculation part 131b. Therefore, the detect element 131a and the calculation part 131b stop the operation. As a result, the rotation angle $\theta m$ of the motor 11 and the number of rotations N of the motor 11 may not be detectable, if no backup power supply is provided.

However, the rotation angle detector 13 is provided with the power storage device 134 and the charger 136.

When the ignition switch IG1 is in an ON state, and the electric power is supplied to the in-vehicle battery B1 from the alternator, the charger 136 supplies the electric power to the power storage device 134 from the in-vehicle battery B1, and charges the power storage device 134.

Therefore, the power storage device 134, which has the electric power storage capacity that is capable of continuing a supply of the voltage to the detect element 131a and the calculation part 131b for a required time period for a replacement of the in-vehicle battery B1, is sufficiently and fully charged.

Further, when the ignition switch IG1 is in an OFF state and is not supplying the electric power to the in-vehicle battery B1 from the alternator, the charger 136 does not charge the power storage device 134.

Therefore, a run-down (i.e., an exhaustion) of the in-vehicle battery B1 due to the charging of the power storage device 134 or a similar situation is prevented.

The detect element 131a operates by receiving a supply of the voltage to the voltage input terminal from the power storage device 134, via the capacitor 135 and the regulator 131d, and detects the rotating magnetic field of the magnet 130.

The calculation part 131b operates by receiving a supply of the voltage to the voltage input terminal from the power storage device 134, via the capacitor 135 and the regulator 131d, and calculates the rotation angle $\theta m$ of the motor 11 and the number of rotations N of the motor 11, based on the detection result of the detect element 131a.

Therefore, even if the steering wheel 140 is steered during a replacement of the in-vehicle battery B1, the rotation angle $\theta m$ of the motor 11 and the number of rotations N of the motor 11 accompanying the steering operation of the steering wheel 140 is securely calculated.

Thus, when the ignition switch IG1 is turned ON again after a replacement of the in-vehicle battery B1, an accurate steering angle $\theta str$ of the steering wheel 140 is detectable.

Next, the effects of the electric power steering device of the first embodiment are described.

According to the first embodiment, the rotation angle detector 13 is provided with the detection section 131 and the power storage device 134.

The detection section 131 is a function block (i) to which the voltage is supplied from the in-vehicle battery B1 via the regulator 131d regardless of ON and OFF of the ignition switch IG1, and (ii) which detects the rotation angle $\theta m$ of the motor 11 and the number of rotations N of the motor 11.

The power storage device 134 is a separate power source separately disposed from the in-vehicle battery B1 that supplies the voltage to the detection section 131. That is, the rotation angle detector 13 is provided with the power storage device 134 that supplies voltage to the detection section 131 separately from the voltage supply of the in-vehicle battery B1.

Therefore, even when the voltage of the in-vehicle battery B1 lowers or the voltage supply from the battery B1 is interrupted, the voltage is continuously supplied to the detection section 131 from the power storage device 134.

Thus, even when the voltage of the in-vehicle battery B1 lowers or the voltage supply from the battery B1 is interrupted, the rotation angle $\theta m$ of the motor 11 and the number of rotations N of the motor 11 are continuously detectable.

Thereby, even when the voltage of the in-vehicle battery B1 lowers, or the voltage supply from the battery B1 is interrupted, the steering angle $\theta str$ of the steering wheel is accurately detectable.

According to the first embodiment, the power storage device 134 is chargeable, and the charger 136 supplies the electric power to the power storage device 134 from the in-vehicle battery B1 and charges the power storage device 134.

Therefore, the electric power storage/supply capacity of the power storage device 134 is securely reserved.

Thus, even when a contingency situation where the voltage of the in-vehicle battery B1 lowers, or the voltage supply from the battery B1 is interrupted occurs repeatedly, the rotation angle $\theta m$ of the motor 11 and the number of rotations N of the motor 11 are continuously detectable.

According to the first embodiment, the in-vehicle battery B1 is chargeable, and the charger 136 charges the power storage device 134, when the electric power is supplied to the in-vehicle battery B1 from an outside of the rotation angle detector 13, for the charging of the in-vehicle battery B1.

Therefore, the power storage device 134 is securely chargeable, while preventing a situation in which the voltage of the in-vehicle battery B1 lowers due to the charging of the power storage device 134.

According to the first embodiment, the charger 136 does not charge the power storage device 134, when the electric power for charging the in-vehicle battery B1 is not supplied to the in-vehicle battery B1 from the outside of the detector 13.

Therefore, a situation in which the in-vehicle battery B1 runs down (i.e., is exhausted) due to the charging of the power storage device 134 is prevented.

According to the first embodiment, the power storage device 134 has the electric power storage capacity for continuously supplying the voltage to the detection section 131 for a required time period for a replacement of the in-vehicle battery B1.

Specifically, the electric power storage capacity of the power storage device 134 is configured to be sufficient for continuously supplying the voltage to the detect element 131a, and to the calculation part 131b for a required time period for a replacement of the in-vehicle battery B1.

Therefore, even when the steering wheel 140 is steered during a replacement of the in-vehicle battery B1, the number of rotations N of the motor 11 accompanying the steering operation of the steering wheel 140 is securely calculated.

According to the first embodiment, the power storage device 134 is a battery.

Therefore, the voltage is securely supplied to the detect element 131a, and to the calculation part 131b from the power storage device 134.

According to the first embodiment, the motor 11 rotates the steering shaft 141 (i.e., a rotation object of the motor 11) of the steering system 14 via the speed reduction gear 12.

Therefore, even when the voltage of the in-vehicle battery B1 lowers, or the voltage supply from the battery B1 is interrupted, the number of rotations of the steering shaft 141 that is a component of the steering system 14, or a rotation object of the motor 11, is continuously detectable.

In the first embodiment, the power storage device 134 gives an example of the storage device having the electric power storage capacity that is required for a replacement of the in-vehicle battery B1 (i.e., for continuously supplying the voltage to the detection section 131 for a required time period of a replacement of the battery B1). However, such a configuration may be modified.

The power storage device 134 may have the electric power storage capacity that is required for continuously supplying the voltage to the detection section 131 for a preset time period, even when the voltage of the in-vehicle battery B1 lowers, or the voltage supply from the battery B1 is interrupted.

Figure 3:
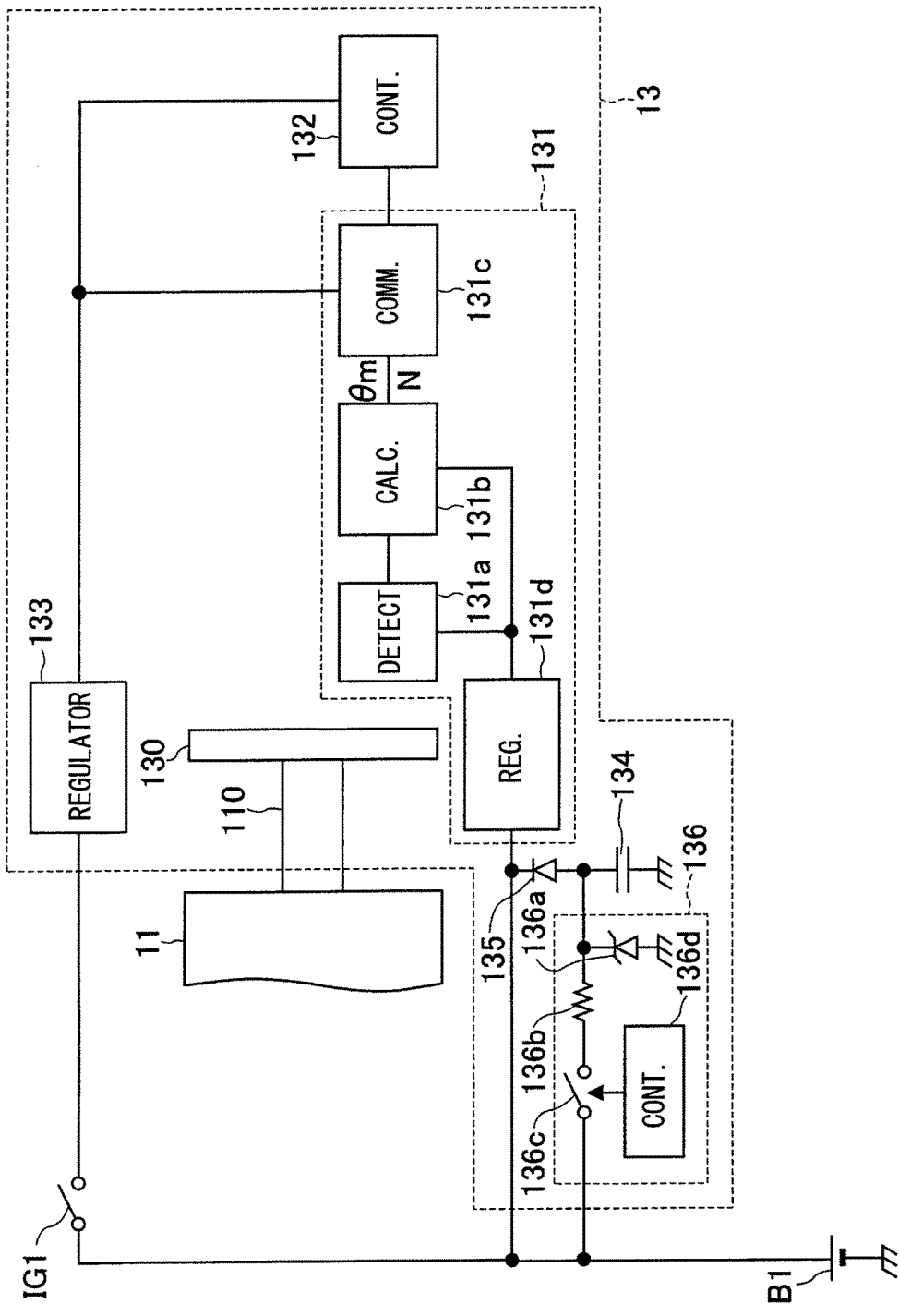
FIG. 3 is a circuit diagram of the rotation angle detector in a modification form of the first embodiment.

In the first embodiment, the power storage device 134 gives an example of a battery. However, such a configuration may be modified. As shown in FIG. 3, the power storage device 134 may be a capacitor.

In the first embodiment, the rotation angle detector 13 gives an example in which the charger 136 charges the power storage device 134. However, such a configuration may be modified.

As long as the electric power storage capacity of the power storage device 134 is sufficiently large, the charger 136 is dispensable.

In the first embodiment, one power storage device 134 is provided and this one power storage device 134 is used to supply the voltage to both of the detect element 131a and the calculation part 131b. However, such a configuration may be modified.

Figure 4:
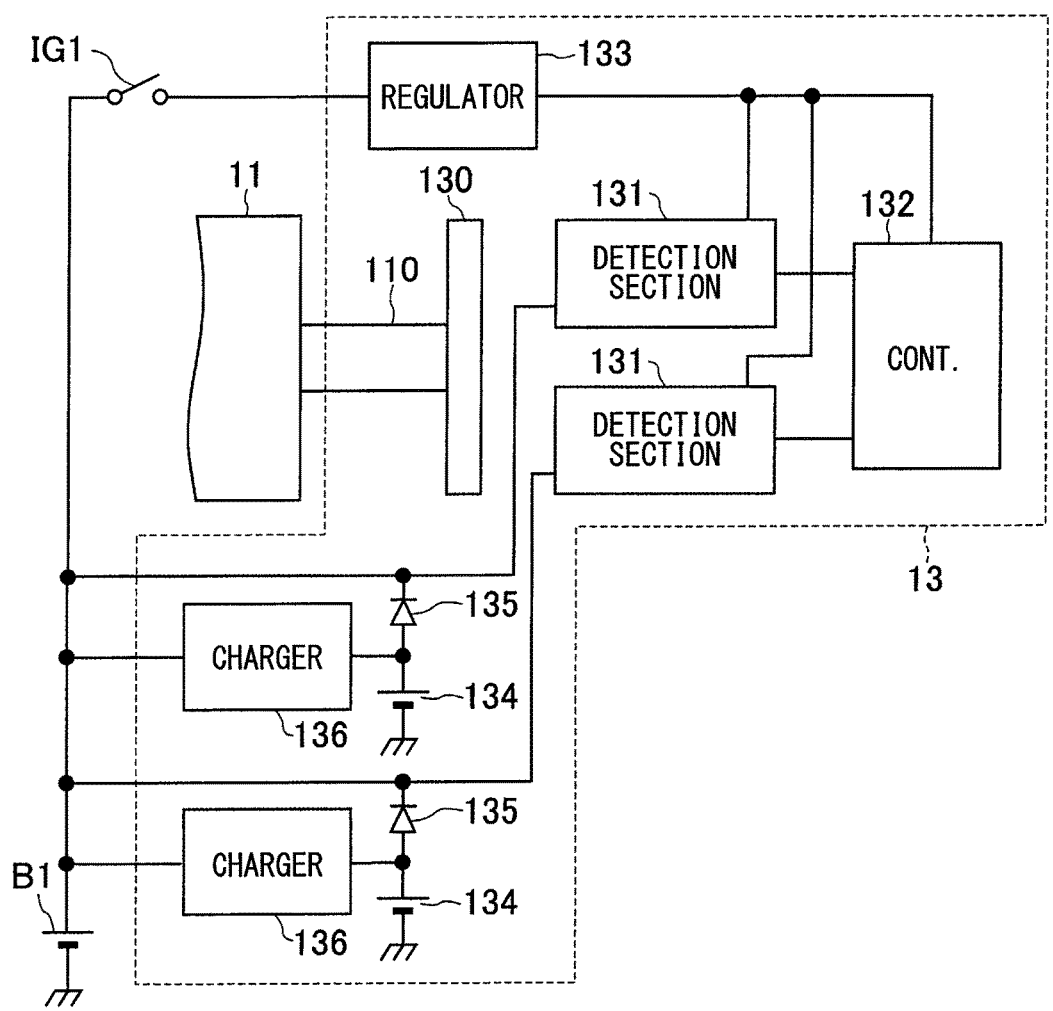
FIG. 4 is a circuit diagram of the rotation angle detector in another modification form of the first embodiment.

The detection section 131 and the power storage device 134 may be provided in two sets as shown in FIG. 4, for the redundancy of the configuration. In such manner, two power storage devices 134 supply the voltage to respectively different detection sections 131, thereby enabling a continuation of the voltage supply from the other power storage device 134 to the other detection section 131, even when the voltage supply from one power storage device 134 to one detection section 131 is interrupted. That is, a redundancy (for a contingency situation) is provided in such manner.

Further, the detection section 131 and the power storage device 134 may be provided in three sets or more. That is, by providing plural sets of the detection section 131 and the power storage device 134, the redundancy of the rotation angle detector 13 is improved.

Second Embodiment

Next, the electric power steering device of the second embodiment is described. In the electric power steering device of the second embodiment, a method of supplying the voltage from the power storage device to the detection section in the rotation angle detector of the electric power steering device is changed from the first embodiment.

The electric power steering device of the second embodiment is the same as the electric power steering device of the first embodiment except for the rotation angle detector. Therefore, the description of the other parts other than the subject rotation angle detector is omitted from the present embodiment.

Figure 5:
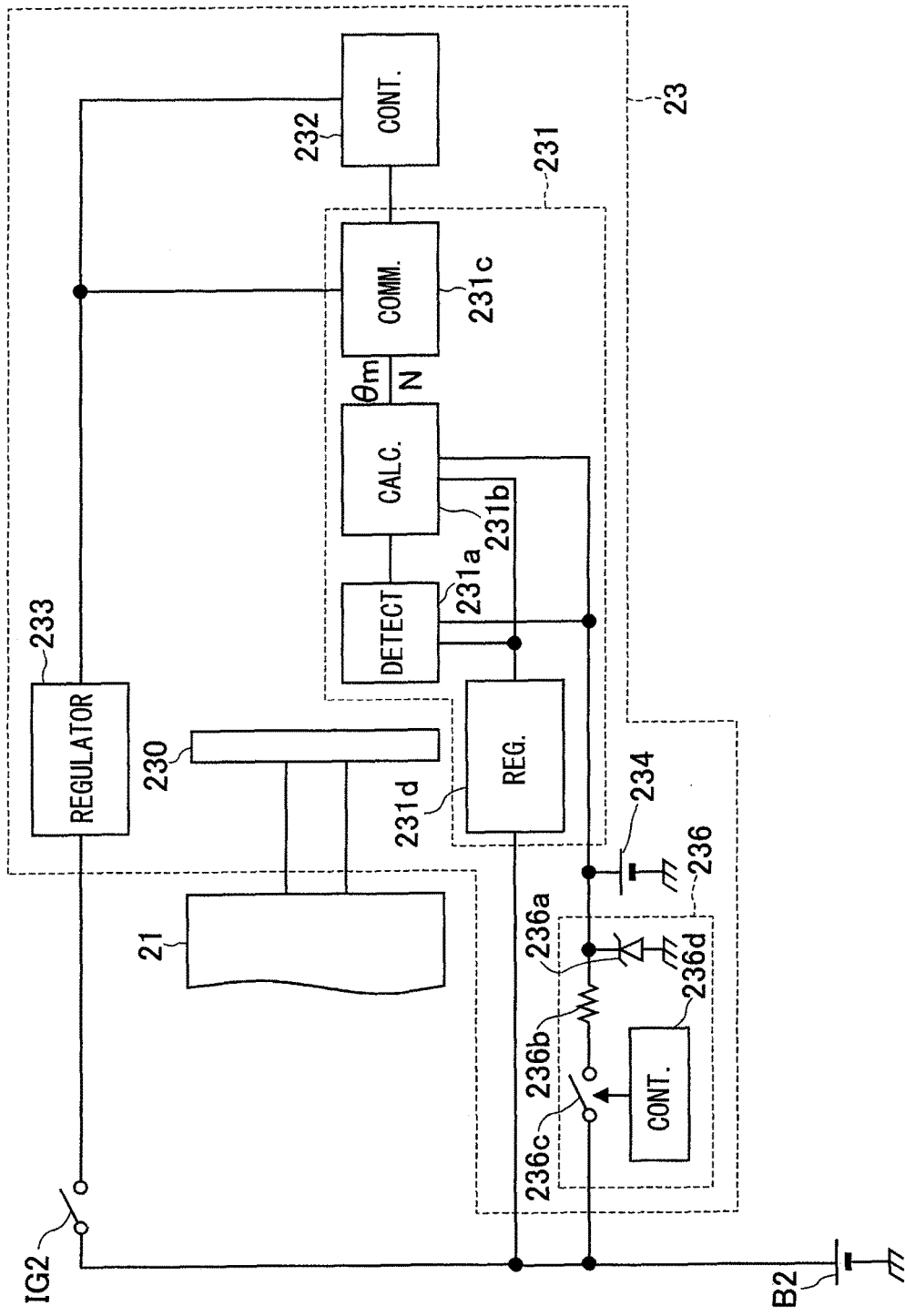
FIG. 5 is a circuit diagram of the rotation angle detector in a second embodiment of the present disclosure.

First, with reference to FIG. 5, a configuration of the rotation angle detector of the second embodiment is described.

A rotation angle detector 23 shown in FIG. 5 is a device that detects the steering angle θstr of the steering wheel while detecting the rotation angle θm of a motor 21.

The rotation angle detector 23 is provided with a magnet 230, a detection section 231, a control unit 232, a regulator 233, a power storage device 234, and a charger 236.

The magnet 230 in the second embodiment is the same as the magnet 130 in first embodiment, and is configured in the same manner as the first embodiment.

The detection section 231 receives a supply of the voltage from an in-vehicle battery B2 regardless of ON and OFF of an ignition switch IG2 for an operation of a part of the detection section 231, and also receives a supply of the voltage from the power storage device 234 for an operation of a part of the detection section 231, which makes the detection section 231 serve as a function block that detects the rotation angle θm of the motor 21 and the number of rotations N of the motor 21.

Further, when the ignition switch IG2 is turned ON, the remaining part of the detection section 231 operates by receiving a supply of the voltage from the regulator 233, and serves as a function block that detects the number of rotations N of the motor 21, and outputs the detected rotation angle θm of the motor 21 and the detected number of rotations N of the motor 21.

The detection section 231 has a detect element 231a, a calculation part 231b, a communications part 231c, and a regulator 231d.

The detect element 231a operates, regardless of ON and OFF of the ignition switch IG2, by receiving a supply of the voltage from the in-vehicle battery B2 via the regulator 231d, and also operates by receiving a supply of the voltage from the power storage device 234, and detects the rotating magnetic field of the magnet 230.

That is, the detect element 231 is an element that detects information corresponding to the rotation angle of the motor 21.

The detect element 231a is disposed at a preset distance from the surface of the magnet 230 having the magnetic poles, just like the detect element 131a of the first embodiment.

The detect elements 231a differs from the detect element 131a of the first embodiment, i.e., has two voltage input terminals. One of the two voltage input terminals of the detect element 231a is connected to the regulator 231d, and the other voltage input terminal of the detect element 231a is connected to the power storage device 234, and the output terminal of the detect element 231a is connected to the calculation part 231b, respectively.

The calculation part 231b operates, regardless of ON and OFF of the ignition switch IG2, by receiving a supply of the voltage from the in-vehicle battery B2 via the regulator 231d, and also operates by receiving a supply of the voltage from the power storage device 234, to serve as a function block that calculates and outputs the rotation angle θm of the motor 21 and the number of rotations N of the motor 21, based on the detection result of the detect element 231a.

The calculation part 231b differs from the calculation part 131b of the first embodiment (i.e., has two voltage input terminals). One of the two voltage input terminals of the calculation part 231b is connected to the regulator 231d, and the other voltage input terminal of the calculation part 231b is connected to the power storage device 234, and the input terminal of the calculation part 231b is connected to the output terminal of the detect element 231a, and the output terminal of the calculation part 231b is connected to the communications part 231c, respectively.

The communications part 231c is the same as the communications part 131c of the first embodiment, and is configured in the same manner as the first embodiment.

The control unit 232 and the regulator 233 are the same as the control unit 132 and the regulator 133 of the first embodiment, and have the same configuration as the first embodiment.

The power storage device 234 is the same device as the power storage device 134 of the first embodiment.

The rotation angle detector 23 differs from the rotation angle detector 13 of the first embodiment (i.e., does not have an element equivalent to the capacitor 135). Therefore, the plus terminal of the power storage device 234 is connected to the other voltage input terminal of the detect element 231a, and to the other voltage input terminal of the calculation part 231b and also to the charger 236, and the minus terminal of the power storage device 234 is connected to the ground, which is different from the connection of the power storage device 134 of the first embodiment.

The charger 236 is a function block that is connected to the in-vehicle battery B2, supplies the electric power to the power storage device 234 from the in-vehicle battery B2, and charges the power storage device 234.

The charger 236 has a Zener capacitor 236a, a resistor 236b, a switch 236c, and a control unit 236d. The Zener capacitor 236a, the resistor 236b, the switch 236c, and the control unit 236d are the same as the Zener capacitor 136a, the resistor 136b, the switch 136c, and the control unit 136d of the first embodiment, and respectively have the same configurations as the first embodiment.

Next, with reference to FIG. 5, an operation of the rotation angle detector of the second embodiment is described.

Since the operation at a time when the ignition switch is turned ON and the operation at a time when the ignition switch is turned OFF are the same as the first embodiment, description regarding such operations is omitted from the present embodiment.

In the following, the operation at a time when the in-vehicle battery B2 is removed from the vehicle for a replacement is described.

When the in-vehicle battery B2 in FIG. 5 is removed from the vehicle for a replacement, the voltage is no longer supplied to one of the two voltage input terminals on each of the detect element 231a and the calculation part 231b.

Therefore, the detect element 231a and the calculation part 231b stop the operation. As a result, the rotation angle θm of the motor 21 and the number of rotations N of the motor 21 may not be detectable, if no backup power supply is provided.

However, the rotation angle detector 23 is provided with the power storage device 234 and the charger 236.

The charger 236 operates in the same manner as the charger 136 of the first embodiment. Therefore, the power storage device 234 is sufficiently/fully charged. Further, a run-down/exhaustion of the in-vehicle battery B2 due to the charging of the power storage device 234 is prevented.

The detect element 231a operates by receiving a supply of the voltage to the other voltage input terminal from the power storage device 234, and detects the rotating magnetic field of the magnet 230.

The calculation part 231b operates by receiving a supply of the voltage to the other voltage input terminal from the power storage device 234, and calculates the number of rotations N of the motor 21 based on the detection result of the detect element 231a.

Therefore, even when the steering wheel is steered during a replacement of the in-vehicle battery B2, the rotation angle θm of the motor 21 and the number of rotations N of the motor 21 accompanying the steering operation of the steering wheel 140 is securely calculated.

Therefore, when the ignition switch IG2 is turned ON again after a replacement of the in-vehicle battery B2, an accurate steering angle θstr of the steering wheel 140 is detectable.

Next, the effects of the rotation angle detector of the second embodiment are described.

According to the second embodiment, the same effects as the first embodiment are achieved, even though the method of the voltage supply from the power storage device to the detect element differs from the first embodiment.

According to the second embodiment, although two voltage input terminals have to be provided on the detect element 231a and the calculation part 231b, the capacitor 135 in the first embodiment is dispensed. Therefore, the number of components is reduced.

In the second embodiment, the power storage device 234 gives an example of the storage device having the electric power storage capacity that is required for a replacement of the in-vehicle battery B2 (i.e., for continuously supplying the voltage to the detection section 231 for a required time period for the battery replacement. However, such a configuration may be modified.

The power storage device 234 may have the electric power storage capacity that is required for continuously supplying the voltage to the detection section 231 for a preset time period, even when the voltage of the in-vehicle battery B2 lowers, or the voltage supply from the battery B2 is interrupted.

In the second embodiment, although the power storage device 234 gives an example of a battery, such a configuration may be modified.

Figure 6:
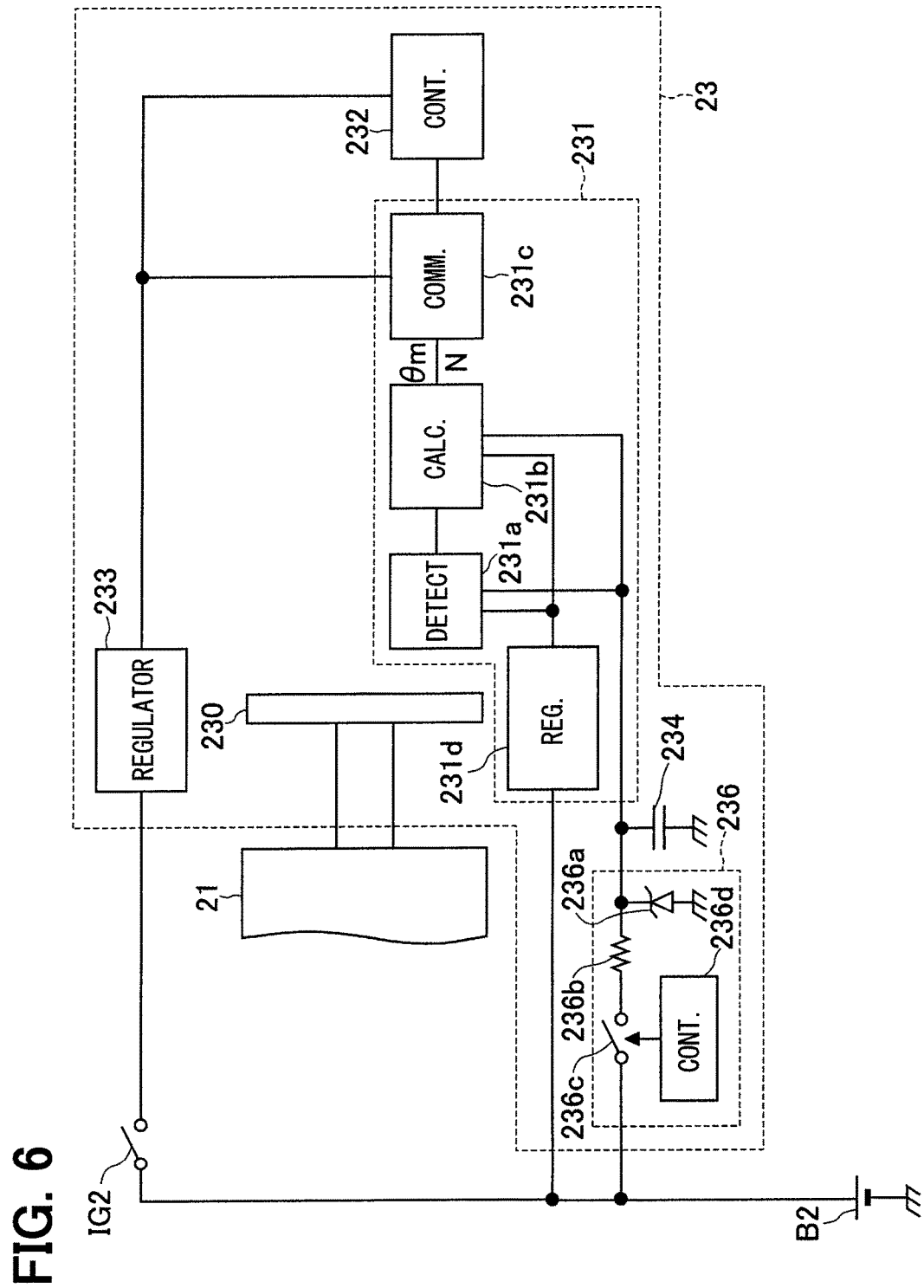
FIG. 6 is a circuit diagram of the rotation angle detector in a modification form of the second embodiment.

As shown in FIG. 6, the power storage device 234 may be a capacitor.

In the second embodiment, although the rotation angle detector 23 gives an example in which the charger 236 is provided to charge the power storage device 234, such a configuration may be modified.

As long as the electric power storage capacity of the power storage device 234 is sufficiently large, the charger 236 is dispensable.

In the second embodiment, although one power storage device 234 is provided and this one power storage device 234 is used to supply the voltage to both of the detect element 231a and the calculation part 231b, such a configuration may be modified.

Figure 7:
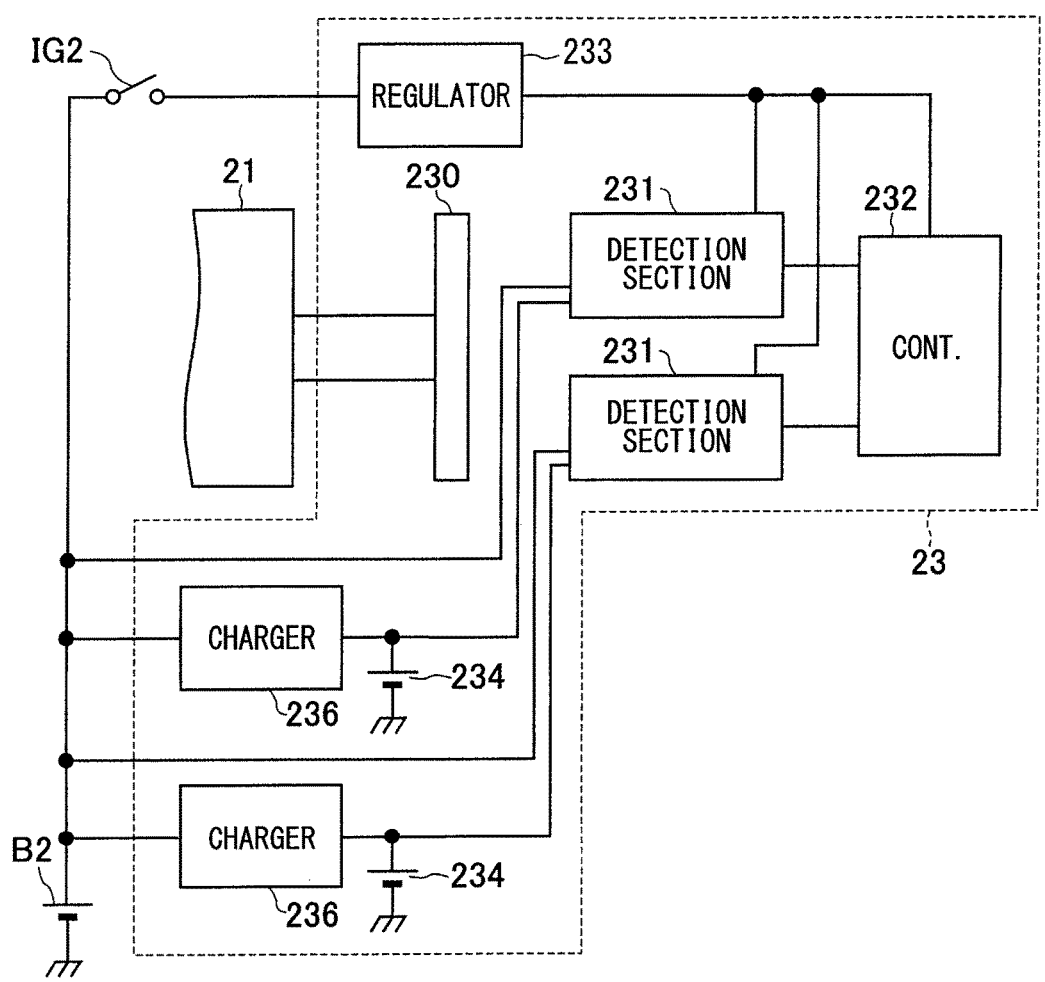
FIG. 7 is a circuit diagram of the rotation angle detector in another modification form of the second embodiment.

The detection section 231 and the power storage device 234 may be provided in two sets as shown in FIG. 7, for the redundancy of the configuration. In such manner, two power storage devices 234 supply the voltage to two detection sections 231, thereby enabling a continuation of the voltage supply from the other power storage device 234 to the other detection section 231 even when the voltage supply from one power storage device 234 to one detection section 231 is interrupted. That is, a redundancy (for a contingency situation) is provided in such manner.

Further, the detection section 231 and the power storage device 234 may be provided in three sets or more. That is, by providing plural sets of the detection section 231 and the power storage device 234, the redundancy of the rotation angle detector 23 is improved.

Third Embodiment

Next, the electric power steering device of the third embodiment is described. The electric power steering device of the third embodiment has a different configuration for the detect element of the rotation angle detector, which is changed from the one in the first embodiment.

The electric power steering device of the third embodiment is the same as the electric power steering device of the first embodiment, except for the rotation angle detector. Therefore, the description of the configuration other than the rotation angle detector is omitted from the present embodiment.

Figure 8:
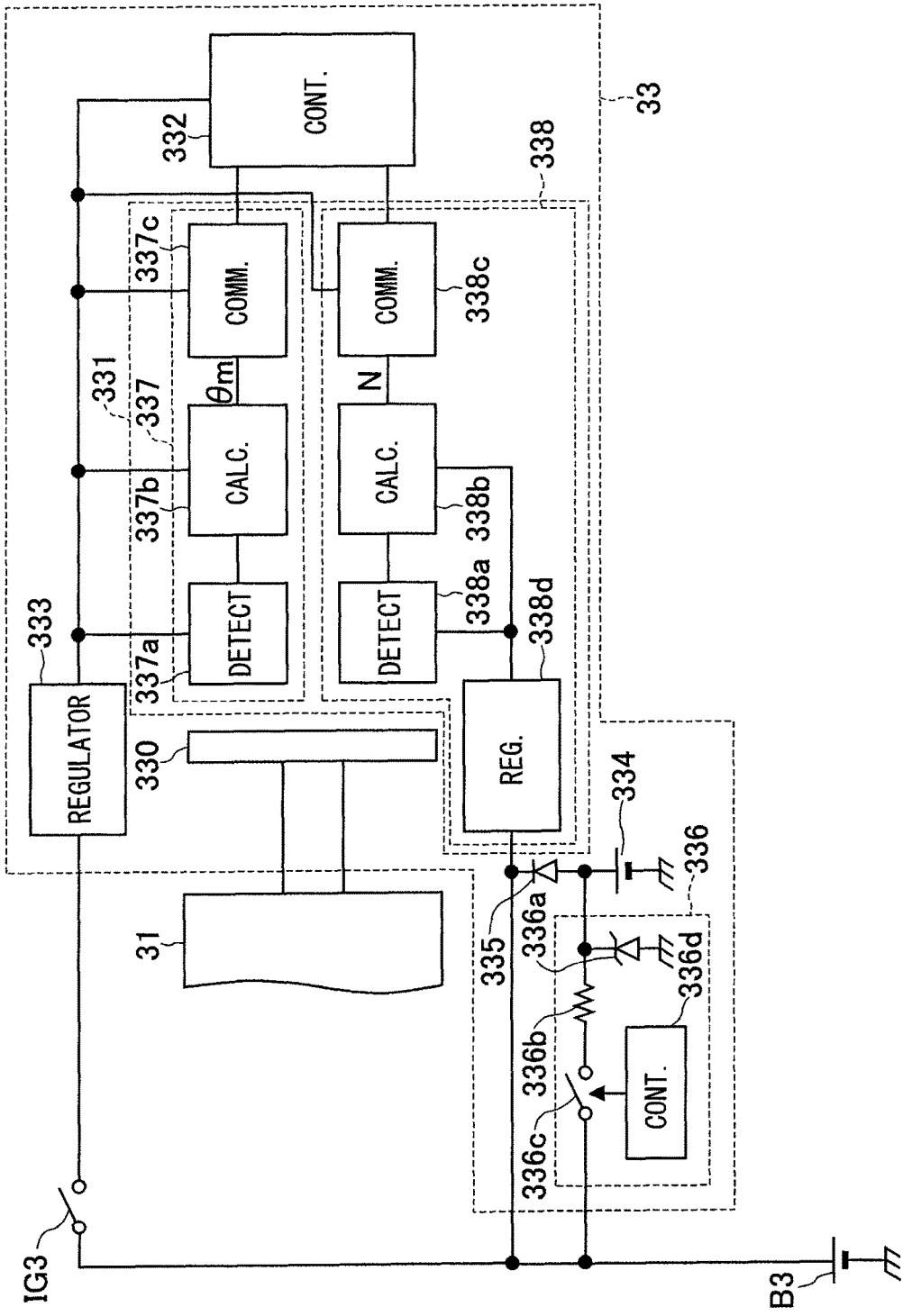
FIG. 8 is a circuit diagram of the rotation angle detector in a third embodiment of the present disclosure.

First, with reference to FIG. 8, the configuration of the rotation angle detector of the third embodiment is described.

A rotation angle detector 33 shown in FIG. 8 is a device that detects the steering angle $\theta str$ of the steering wheel 140 while detecting the rotation angle $\theta m$ of a motor 31.

The rotation angle detector 33 is provided with a magnet 330, a detection section 331, a control unit 332, a regulator 333, a power storage device 334, a capacitor 335, and a charger 336.

The magnet 330 is the same as the magnet 130 of the first embodiment, and has the same configuration as the first embodiment.

The detection section 331 receives a supply of the voltage from an in-vehicle battery B3 regardless of ON and OFF of an ignition switch IG3, for an operation of a part of the detection section 331, and also receives a supply of the voltage from the power storage device 334 via the capacitor 335 for an operation of a part of the detection section 331, which makes the detection section 331 serve as a function block that detects the number of rotations N of the motor 31.

Further, when the ignition switch IG3 is turned ON, the remaining part of the detection section 331 operates by receiving a supply of the voltage from the regulator 333, which makes the detection section 331 serve as a function block that detects the rotation angle $\theta m$ of the motor 31, and outputs the detected rotation angle $\theta m$ of the motor 31 and the detected number of rotations N of the motor 31.

The detection section 331 has a rotation angle detection unit (i.e., rotation angle voltage detector) 337 and rotation number detection unit (i.e., rotation number voltage detector) 338.

The rotation angle detection unit 337 is a function block that operates by receiving a supply of the voltage from the in-vehicle battery B3 via the regulator 333, when the ignition switch IG3 is turned ON, and detects the rotation angle $\theta m$ of the motor 31.

The rotation angle detection unit 337 has a detect element 337a, a calculation part 337b, and a communications part 337c.

The detect element 337a is an element that operates by receiving a supply of the voltage from the in-vehicle battery B3 via the regulator 333, when the ignition switch IG3 is turned ON, and detects the rotating magnetic field of the magnet 330. That is, the detect element 337a is an element that detects information corresponding to the rotation angle of the motor 31.

The detect element 337a is disposed at a preset distance from the surface of the magnet 330 having the magnetic poles, just like the detect element 131a of the first embodiment. The voltage input terminal of the detect element 337a is connected to the regulator 333, and the output terminal of the detect element 337a is connected to the calculation part 337b, respectively.

The calculation part 337b is a function block that operates by receiving a supply of the voltage from the in-vehicle battery B3 via the regulator 333 when the ignition switch IG3 is turned ON, and calculates and outputs the rotation angle $\theta m$ of the motor 31 based on the detection result of the detect element 337a.

The voltage input terminal of the calculation part 337b is connected to the regulator 333, the input terminal thereof is connected to the output terminal of the detect element 337a, and the output terminal thereof is connected to the communications part 337c, respectively.

The communications part 337c is a function block that operates by receiving a supply of the voltage from the in-vehicle battery B3 via the regulator 333 when the ignition switch IG3 is turned ON, and transmits the rotation angle $\theta m$ of the motor 31 that is inputted from the calculation part 337b by serial communications.

The voltage input terminal of the communications part 337c is connected to the regulator 333, the input terminal of the communications part 337c is connected to the output terminal of the calculation part 337b, and the output terminal of the communications part 337c is connected to the control unit 332, respectively.

The rotation number detection unit 338 receives a supply of the voltage from the in-vehicle battery B3, regardless of ON and OFF of the ignition switch IG3, for an operation of a part of the rotation number detection unit 338, and also receives a supply of the voltage from the power storage device 334 via the capacitor 335 for an operation of a part of the rotation number detection unit 338, in order for the detection unit 338 to serve as a function block that detects the number of rotations N of the motor 31.

Further, when the ignition switch IG3 is turned ON, the remaining part of the rotation number detection unit 338 operates by receiving a supply of the voltage from the regulator 333, and serves as a function block that outputs the detected number of rotations N of the motor 31.

The rotation number detection unit 338 has a detect element 338a, a calculation part 338b, and a communications part 338c.

The detect element 338a operates, regardless of ON and OFF of the ignition switch IG3, by receiving a supply of the voltage from the in-vehicle battery B3 via the regulator 338d, and also operates by receiving a supply of the voltage from the power storage device 334 via the capacitor 335 and the regulator 338d, to serve as an element that detects the rotating magnetic field of the magnet 330. That is, the detect element 338a is an element that detects information corresponding to the rotation angle of the motor 31.

The detect element 338a is disposed at a preset distance from the surface of the magnet 330 having the magnetic poles, just like the detect element 131a of the first embodiment.

The voltage input terminal of the detect element 338a is connected to the regulator 338d, and the output terminal of the detect element 338a is connected to the calculation part 338b, respectively.

The calculation part 338b operates, regardless of the ON position or the OFF position of the ignition switch IG3, by receiving a supply of the voltage from the in-vehicle battery B3 via the regulator 338d, and also operates by receiving a supply of the voltage from the power storage device 334 via the capacitor 335 and the regulator 338d, to serve as a function block that calculates and outputs the number of rotations N of the motor 31, based on the detection result of the detect element 338a.

The voltage input terminal of the calculation part 338b is connected to the regulator 338d, the input terminal of the calculation part 338b is connected to the output terminal of the detect element 338a, and the output terminal of the calculation part 338b is connected to the communications part 338c, respectively.

The communications part 338c operates by receiving a supply of the voltage from the in-vehicle battery B3 via the regulator 333 when the ignition switch IG3 is turned ON, to serve as a function block that transmits the number of rotations N of the motor 31 inputted from the calculation part 338b by serial communications.

The voltage input terminal of the communications part 338c is connected to the regulator 333, the input terminal of the communications part 338c is connected to the output terminal of the calculation part 338b, and the output terminal of the communications part 338c is connected to the control unit 332, respectively.

The regulator 338d is an element that converts, regardless of the ON and OFF positions of the ignition switch IG3, the voltage of the in-vehicle battery B3 to a preset voltage, and supplies the converted voltage to the detect element 338a, and to the calculation part 338b.

When the voltage of the in-vehicle battery B3 lowers, or the voltage supply from the battery B3 is interrupted, the regulator 338d converts the voltage of the power storage device 334 supplied via the capacitor 335 to the preset voltage, and supplies the converted voltage to the detect element 338a and to the calculation part 338b.

The input terminal of the regulator 338d is connected to the plus terminal of the in-vehicle battery B3, and is also connected to the capacitor 335. The output terminal of the regulator 338d is connected to the detect element 338a and to the calculation part 338b.

The control unit 332 operates by receiving a supply of the voltage from the in-vehicle battery B3 via the regulator 333, when the ignition switch IG3 is turned ON, and serves as a function block that calculates the steering angle θstr of the steering wheel, based on (i) the rotation angle θm of the motor 31 that is received from the communications part 337c, (ii) the number of rotations N of the motor 31 which received from the communications part 338c, and (iii) the speed reduction ratio of the speed reduction gear 12, which is set up in advance.

Further, the control unit 332 also serves as a function block that controls the motor 31 based on (i) the rotation angle θm of the motor 31 which is received from the communications part 337c, (ii) the steering torque of the steering wheel inputted from the torque sensor 10, and (iii) the calculated steering angle θstr of the steering wheel.

The voltage input terminal of the control unit 332 is connected to the regulator 333, and the input terminals of the control unit 332 is connected to the output terminals of both of the communications parts 337c and 338c, respectively.

The regulator 333 is an element that converts the voltage of the in-vehicle battery B3 to a preset voltage, when the ignition switch IG3 is turned ON, and supplies the converted voltage to the detect element 337a, to the calculation part 337b, to the communications parts 337c and 338c, and to the control unit 332, respectively.

The input terminal of the regulator 333 is connected, via the ignition switch IG3, to the plus terminal of the in-vehicle battery B3 that has its minus terminal connected to the ground.

The output terminal of the regulator 333 is connected to each of the voltage input terminals of the detect element 337a, of the calculation part 337b, of the communications parts 337c and 338c, and of the control unit 332.

The power storage device 334 is a power source that supplies the voltage to the detect element 338a and to the calculation part 338b via the capacitor 335 and the regulator 338d, which is a chargeable power source and is different from the in-vehicle battery B3. More specifically, the power storage device 334 is a battery that is chargeable.

The electric power storage capacity of the power storage device 334 at least enables, for a required time period that is required for a replacement of the in-vehicle battery B3, a continuous voltage supply to the detect element 338a, and to the calculation part 338b.

The plus terminal of the power storage device 334 is connected to the input terminal of the regulator 338d, via the capacitor 335, and is also connected to the charger 336; and the minus terminal of the power storage device 334 is connected to the ground.

The charger 336 is a function block that is connected to the in-vehicle battery B3, supplies the electric power to the power storage device 334 from the in-vehicle battery B3, and charges the power storage device 334.

The charger 336 has a Zener capacitor 336a, a resistor 336b, a switch 336c, and a control unit 336d.

The Zener capacitor 336a, the resistor 336b, the switch 336c, and the control unit 336d are the same as the Zener capacitor 136a, the resistor 136b, the switch 136c, and the control unit 136d of the first embodiment, and have the same configuration as the first embodiment.

Next, with reference to FIG. 8, an operation of the electric power steering device of the third embodiment is described.

When the ignition switch IG3 is turned ON in FIG. 8, the regulator 333 converts the voltage of the in-vehicle battery B3 to a preset voltage, and supplies the converted voltage to each of the voltage input terminals of the detect element 337a, of the calculation part 337b, of the communications parts 337c and 338c, and of the control unit 332.

On the other hand, regardless of ON and OFF of the ignition switch IG3, the voltage is supplied from the in-vehicle battery B3 via the regulator 338d to each of the voltage input terminals of the detect element 338a and the calculation part 338b.

The detect element 337a operates by receiving a supply of the voltage to the voltage input terminal from the in-vehicle battery B3 via the regulator 333, and detects the rotating magnetic field of the magnet 330.

The calculation part 337b operates by receiving a supply of the voltage to the voltage input terminal from the in-vehicle battery B3 via the regulator 333, and calculates and outputs the rotation angle θm of the motor 31 based on the detection result of the detect element 337*a*.

The detect element 338*a* operates by receiving a supply of the voltage to the voltage input terminal from the in-vehicle battery B3 via the regulator 338*d*, and detects the rotating magnetic field of the magnet 330.

The calculation part 338*b* operates by receiving a supply of the voltage to the voltage input terminal from the in-vehicle battery B3 via the regulator 338*d*, and calculates and outputs the number of rotations N of the motor 31 based on the detection result of the detect element 338*a*.

The communications part 337*c* operates by receiving a supply of the voltage to the voltage input terminal from the in-vehicle battery B3 via the regulator 333, and transmits the rotation angle θm inputted from the calculation part 337*b* by serial communications.

The communications part 338*c* operates by receiving a supply of the voltage to the voltage input terminal from the in-vehicle battery B3 via the regulator 333, and transmits the number of rotations N of the motor 31 inputted from the calculation part 338*b* by serial communications.

The control unit 332 operates by receiving a supply of the voltage to the voltage input terminal from the in-vehicle battery B3 via the regulator 333, and calculates the steering angle θstr of the steering wheel 140, based on the rotation angle θm that is received from the communications part 337*c*, the number of rotations N of the motor 31 that is received from the communications part 338*c*, and the speed reduction ratio of the speed reduction gear 12 set up in advance.

When the ignition switch IG3 is turned OFF in FIG. 8, the regulator 333 stops the voltage supply to the detect element 337*a*, to the calculation part 337*b*, to the communications parts 337*c* and 338*c*, and to the control unit 332.

On the other hand, regardless of the ON position or the OFF position of the ignition switch IG3, voltage is supplied to each of the voltage input terminals of the detect element 338*a* and the calculation part 338*b* from the in-vehicle battery B3 via the regulator 338*d*.

Due to the stop of the voltage supply from the in-vehicle battery B3 via the regulator 333 to the respective voltage input terminals, the detect element 337*a* and the calculation part 337*b* stop the operation. Therefore, the rotation angle θm of the motor 31 is not detected.

Further, due to the stop of the voltage supply from the in-vehicle battery B3 via the regulator 333 to the respective voltage input terminals, the communications parts 337*c* and 338*c* and the control unit 332 stop the operation.

The detect element 338*a* continues the operation by receiving a supply of the voltage to the voltage input terminal from the in-vehicle battery B3 via the regulator 338*d*, and detects the rotating magnetic field of the magnet 330.

The calculation part 338*b* continues the operation by receiving a supply of the voltage to the voltage input terminal from the in-vehicle battery B3 via the regulator 338*d*, and calculates and outputs the number of rotations N of the motor 31, based on the detection result of the detect element 338*a*.

Therefore, even when the steering wheel 140 is steered before the ignition switch IG3 is turned ON again, the calculation of the number of rotations N of the motor 31 accompanying the steering operation of the steering wheel 140 is continued. Thus, when the ignition switch IG3 is turned ON again, an accurate steering angle θstr of the steering wheel 140 is detectable.

When the in-vehicle battery B3 is removed from the vehicle for a replacement, the voltage supply from the in-vehicle battery B3 is interrupted (i.e., the voltage is no longer supplied to the voltage input terminals of the detect element 338*a* and the calculation part 338*b*). As a result, the detect element 338*a* and the calculation part 338*b* stop the operation, and the number of rotations N of the motor 31 is not detectable.

However, the rotation angle detector 33 is provided with the power storage device 334 and the charger 336.

The charger 336 operates in the same manner as the charger 136 of the first embodiment. Therefore, the power storage device 334 is sufficiently/fully charged. Further, a situation in which the in-vehicle battery B3 runs down or exhausted due to the charging of the power storage device 334 is prevented.

The detect element 338*a* operates by receiving a supply of the voltage to the voltage input terminal from the power storage device 334 via the capacitor 335 and the regulator 338*d*, and detects the rotating magnetic field of the magnet 330.

The calculation part 338*b* operates by receiving a supply of the voltage to the voltage input terminal from the power storage device 334 via the capacitor 335 and the regulator 338*d*, and calculates the number of rotations N of the motor 31 based on the detection result of the detect element 338*a*.

Therefore, even when the steering wheel 140 is steered during a replacement of the in-vehicle battery B3, the number of rotations N of the motor 31 accompanying the steering operation of the steering wheel 140 is securely calculated.

Thus, when the ignition switch IG3 is turned ON again after a replacement of the in-vehicle battery B3, an accurate steering angle θstr of the steering wheel is detectable.

Next, the effects of the electric power steering device of the third embodiment are described.

According to the third embodiment, the rotation angle detector 33 is provided with the rotation angle detection unit 337, the rotation number detection unit 338, and the power storage device 334.

The rotation angle detection unit 337 is a function block (i) to which the voltage is supplied from the in-vehicle battery B3 when the ignition switch IG3 is turned ON, and (ii) which detects the rotation angle θm per one rotation of the motor 31.

The rotation number detection unit 338 is a function block (i) to which the voltage is supplied from the in-vehicle battery B3 regardless of ON and OFF of the ignition switch IG3, and (ii) which detects the number of rotations N of the motor 31.

The power storage device 334 is a power source that supplies the voltage to the rotation number detection unit 338. That is, the rotation angle detector 33 has the power storage device 334 that supplies voltage to the rotation number detection unit 338 besides having the voltage supply from the in-vehicle battery B3.

Therefore, even when the voltage of the in-vehicle battery B3 lowers or the voltage supply from the battery B3 is interrupted, the voltage supply is continued to the rotation number detection unit 338 from the power storage device 334. Thus, even when the voltage of the in-vehicle battery B3 lowers or the voltage supply from the battery B3 is interrupted, the number of rotations N of the motor 31 is continuously detectable. Thereby, even when the voltage of the in-vehicle battery B3 lowers, or the voltage supply from the battery B3 is interrupted, the steering angle θstr of the steering wheel 140 is accurately detectable.

According to the third embodiment, the same effects as the first embodiment other than the above are also achieved based on the same configuration as the first embodiment.

Further, although the power storage device 334 gives an example of the storage device having the electric power storage capacity that is required for a replacement of the in-vehicle battery B3 (i.e., for continuously supplying the voltage to the rotation number detection unit 338) for a required time period in the third embodiment, such a configuration may be modified.

The power storage device 334 may have the electric power storage capacity that is required for continuously supplying the voltage to the rotation number detection unit 338 for a preset time period, even when the voltage of the in-vehicle battery B3 lowers, or the voltage supply from the battery B3 is interrupted.

Although the rotation angle detection unit 337 gives an example of having the calculation part 337b and the communications part 337c in the third embodiment, such a configuration may be modified.

Figure 9:
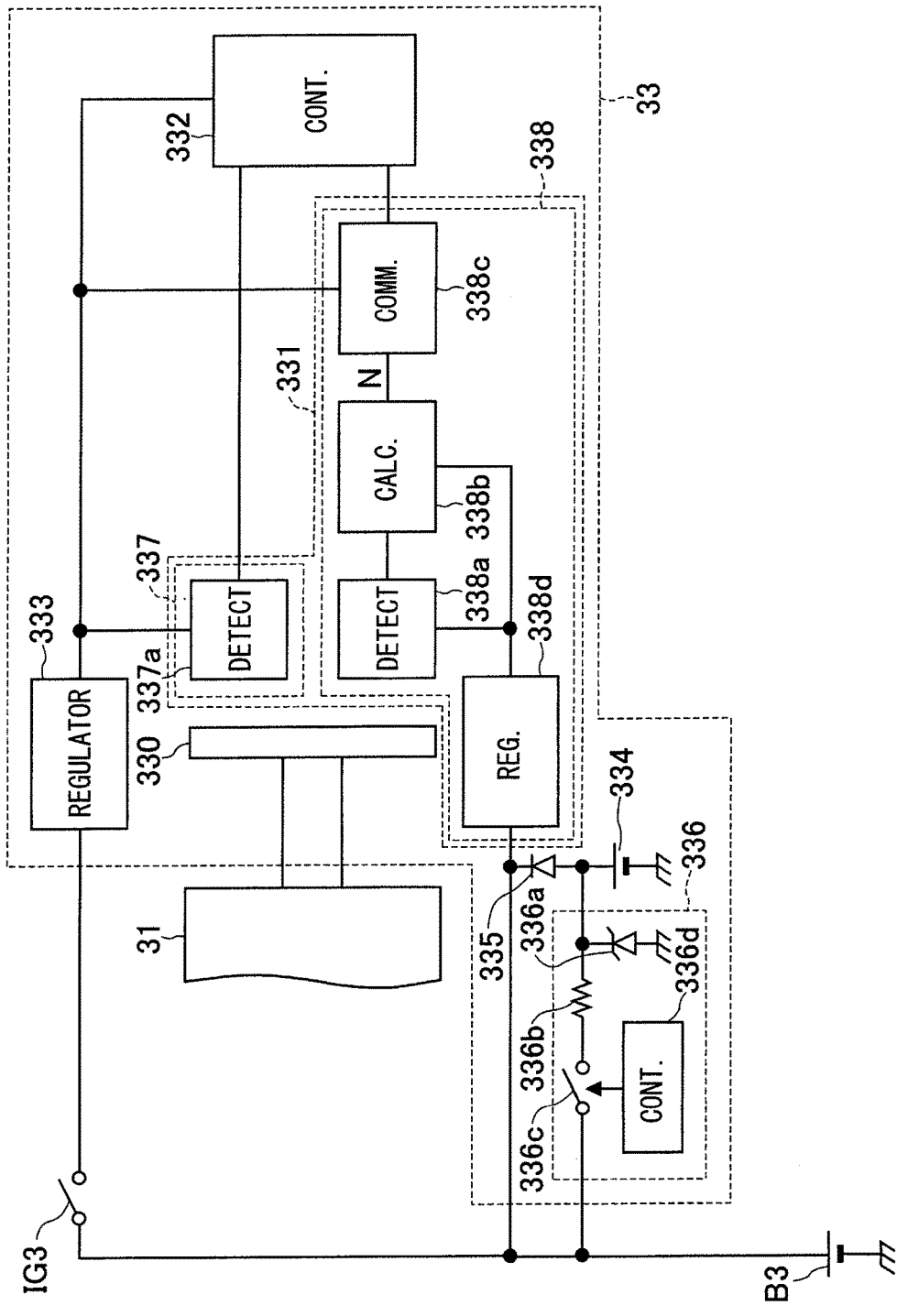
FIG. 9 is a circuit diagram of the rotation angle detector in a modification form of the third embodiment.

When the rotation angle θm of the motor 31 is calculable by the control unit 332 based on the detection result of the detect element 337a, the calculation part 337b and the communications part 337c are dispensable as shown in FIG. 9.

Although the power storage device 334 gives an example of providing the storage device 334 as a battery in the third embodiment, such a configuration may be modified.

Figure 10:
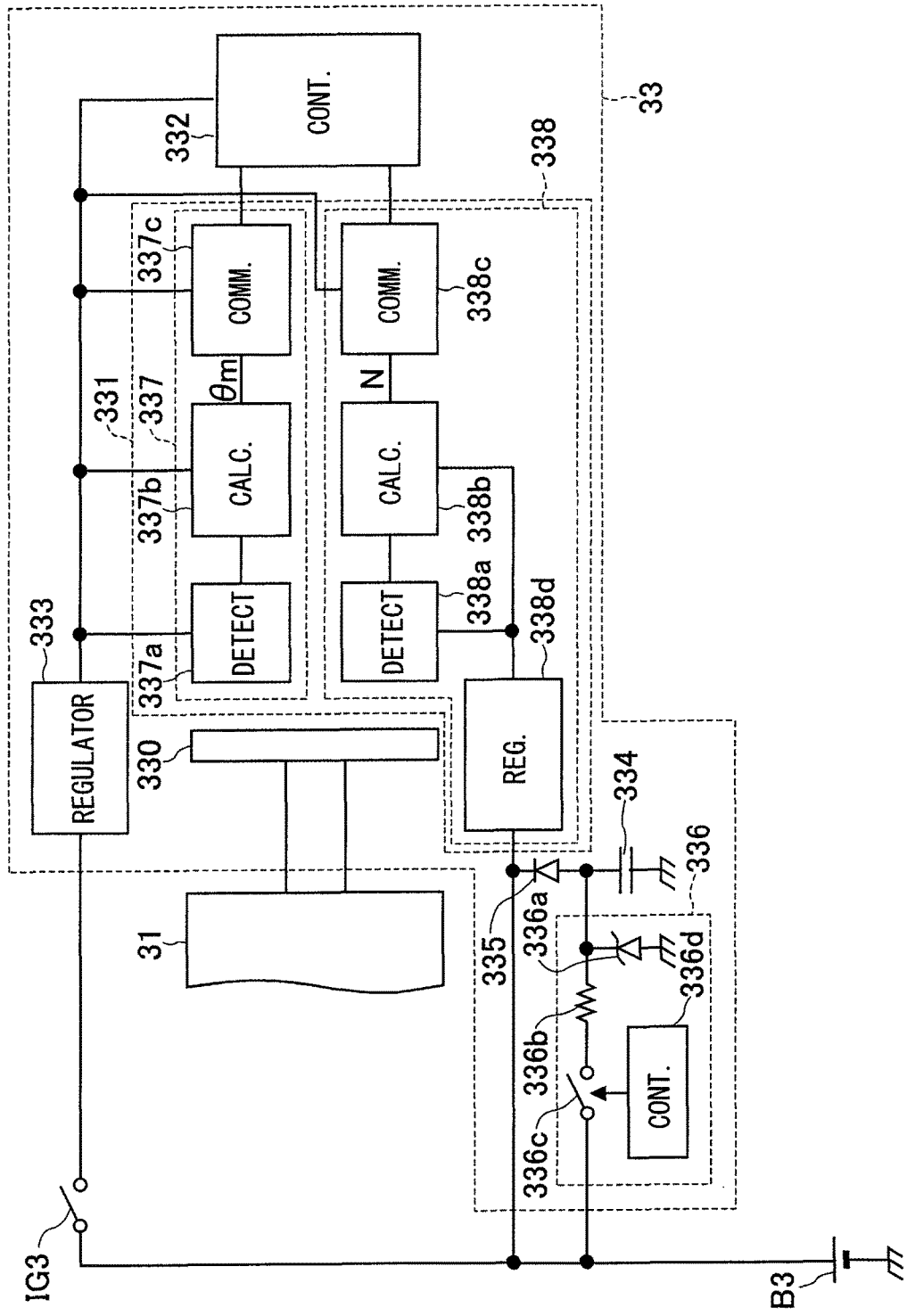
FIG. 10 is a circuit diagram of the rotation angle detector in another modification form of the third embodiment.

As shown in FIG. 10, the power storage device 334 may be a capacitor.

Although the rotation angle detector 33 gives an example of the storage device 334 having the charger 336 for charging the power storage device 334 in the third embodiment, such a configuration may be modified.

As long as the electric power storage capacity of the power storage device 334 is sufficiently large, the charger 336 is dispensable.

In the third embodiment, one power storage device 334 is provided and this one power storage device 334 is used to supply the voltage to both of the detect element 338a and the calculation part 338b. However, such a configuration may be modified.

Figure 11:
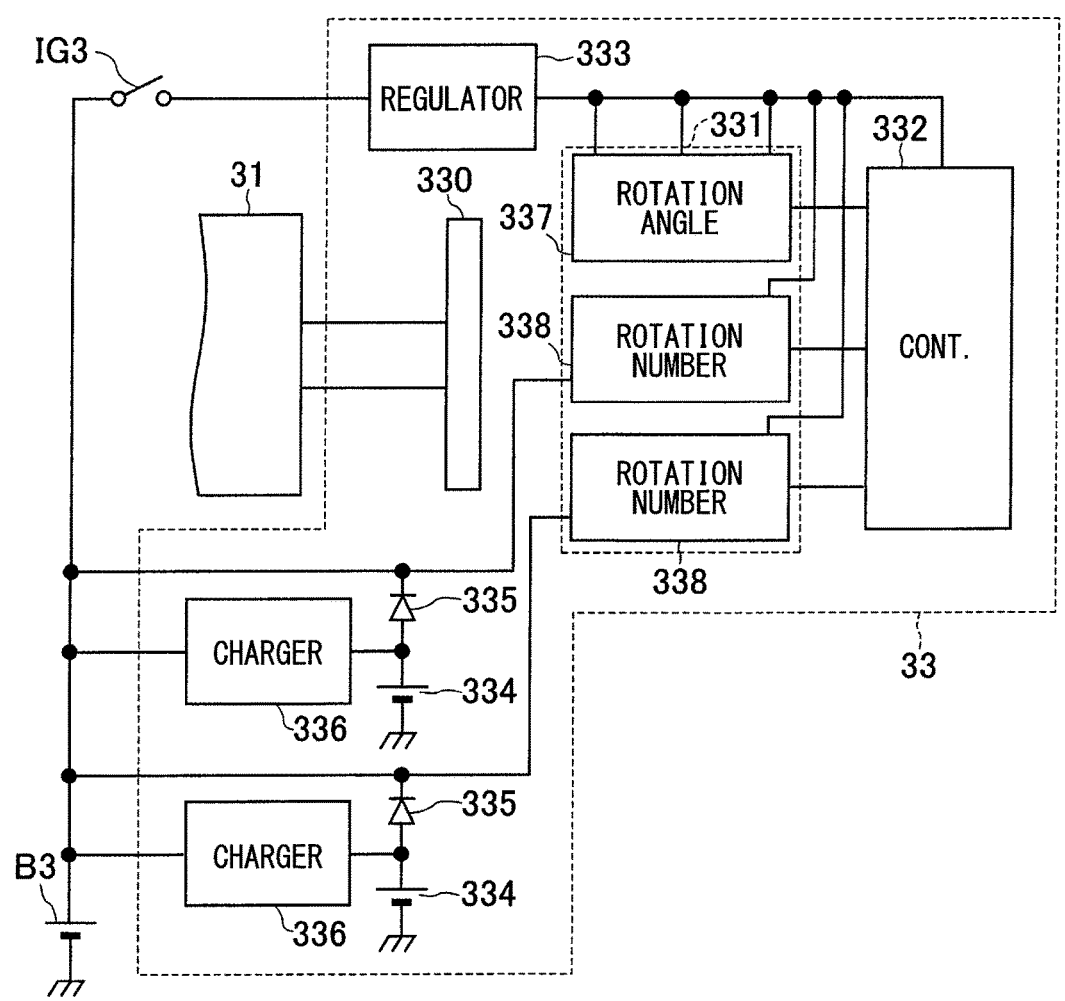
FIG. 11 is a circuit diagram of the rotation angle detector in yet another modification form of the third embodiment.

The rotation number detection unit 338 and the power storage device 334 may be provided in two sets as shown in FIG. 11, for the redundancy of the configuration. In such manner, two power storage devices 334 supply the voltage to two rotation number detection units 338, thereby enabling a continuation of the voltage supply from the other power storage device 334 to the other rotation number detection unit 338 even when the voltage supply from one power storage device 334 to one rotation number detection unit 338 is interrupted. That is, a redundancy (for a contingency situation) is provided in such manner.

Further, the rotation number detection unit 338 and the power storage device 334 may be provided in three sets or more. That is, by providing plural sets of the rotation number detection unit 338 and the power storage device 334, the redundancy of the rotation angle detector 33 is improved.

Fourth Embodiment

Next, the electric power steering device of the fourth embodiment is described. In the electric power steering device of the fourth embodiment, a method of supplying the voltage from the power storage device to the detection section in the rotation angle detector of the electric power steering device is changed from the third embodiment.

The electric power steering device of the fourth embodiment is the same as the electric power steering device of the third embodiment except for the rotation angle detector. Therefore, the description of the other parts other than the subject rotation angle detector is omitted from the present embodiment.

Figure 12:
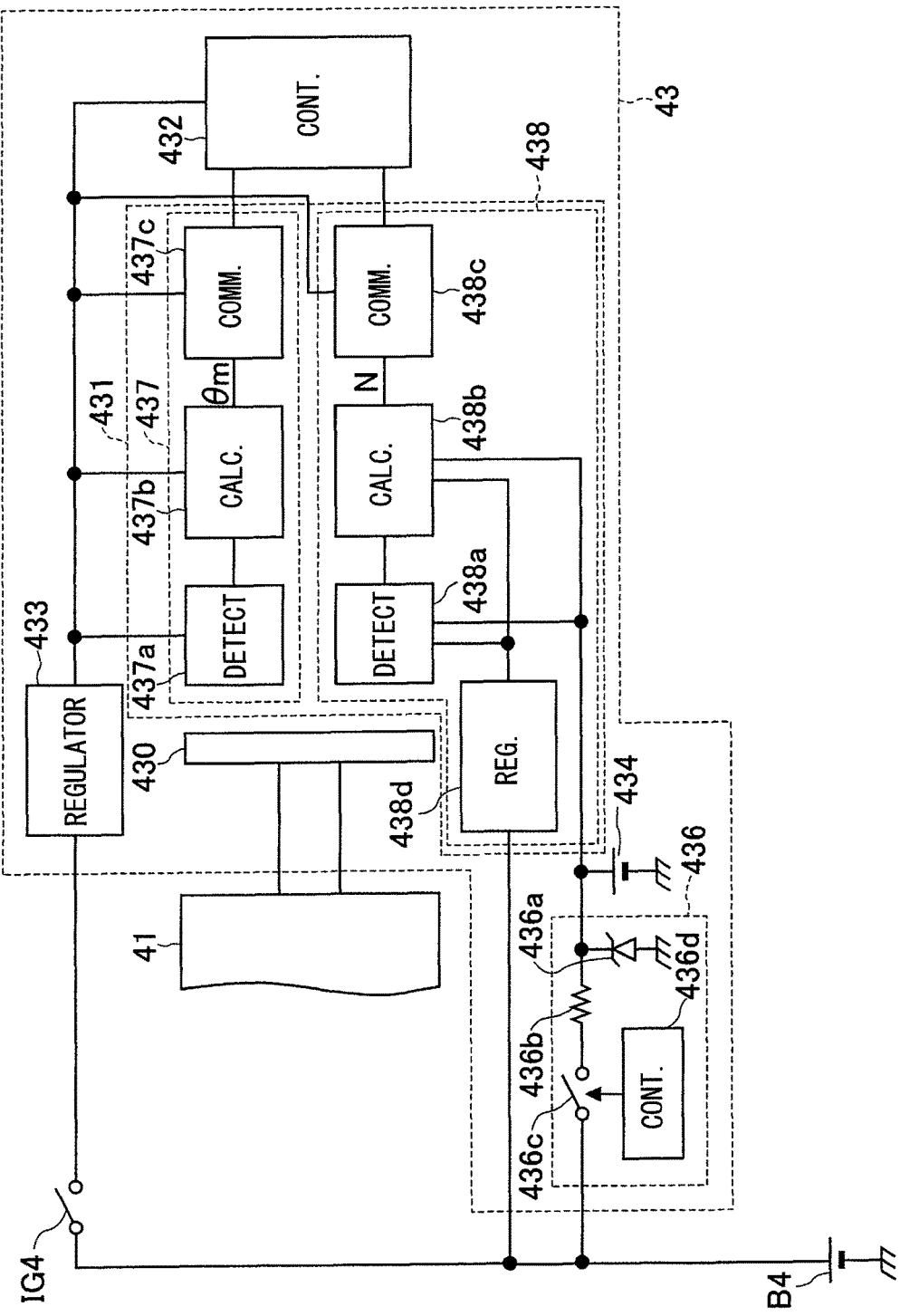
FIG. 12 is a circuit diagram of the rotation angle detector in a fourth embodiment of the present disclosure.

First, with reference to FIG. 12, a configuration of the rotation angle detector of the fourth embodiment is described.

A rotation angle detector 43 shown in FIG. 12 is a device that detects the steering angle θstr of the steering wheel while detecting the rotation angle θm of a motor 41.

The rotation angle detector 43 is provided with a magnet 430, a detection section 431, a control unit 432, a regulator 433, a power storage device 434, and a charger 436.

The magnet 430 in the third embodiment is the same as the third embodiment, and has the same configuration as the third embodiment.

The detection section 431 receives a supply of the voltage from an in-vehicle battery B4 regardless of ON and OFF of an ignition switch IG4 for an operation of a part of the detection section 431, and also receives a supply of the voltage from the power storage device 434 for an operation of a part of the detection section 431, which makes the detection section 431 serve as a function block that detects the number of rotations N of the motor 41.

Further, when the ignition switch IG4 is turned ON, the remaining part of the detection section 431 operates by receiving a supply of the voltage from the regulator 433, and serves as a function block that detects the rotation angle θm of the motor 41, and outputs the detected rotation angle θm and the detected number of rotations N of the motor 41.

The detection section 431 has a rotation angle detection unit 437 and a rotation number detection unit 438.

The rotation angle detection unit 437 is a function block that operates by receiving a supply of the voltage from the in-vehicle battery B4 via the regulator 433 when the ignition switch IG4 is turned ON, and detects the rotation angle θm of the motor 41.

The rotation angle detection unit 437 has a detect element 437a, a calculation part 437b, and a communications part 437c.

The detect element 437a, the calculation part 437b, and the communications part 437c are the same as the detect element 337a, the calculation part 337b, and the communications part 337c of the third embodiment, and have the same configuration as the third embodiment.

The rotation number detection unit 438, regardless of ON and OFF of the ignition switch IG4, receives a supply of the voltage from the in-vehicle battery B4 for an operation of a part of the rotation number detection unit 438, and also receive a supply of the voltage from the power storage device 434 for an operation of a part of the rotation number detection unit 438, to serve as a function block that detects the number of rotations N of the motor 41.

Further, when the ignition switch IG4 is turned ON, the remaining part of the rotation number detection unit 438 operates by receiving a supply of the voltage from the regulator 433, and serves as a function block that outputs the detected number of rotations N of the motor 41.

The rotation number detection unit 438 has a detect element 438a, a calculation part 438b, and a communications part 438c.

The detect element 438a operates, regardless of ON and OFF of the ignition switch IG4, by receiving a supply of the voltage from the in-vehicle battery B4 via the regulator 438d, and also operates by receiving a supply of the voltage from the power storage device 434, to serve as an element that detects the rotating magnetic field of the magnet 430. That is, the detect element 438a is an element which detects information corresponding to the rotation angle of the motor 41.

The detect element 438a is disposed at a preset distance from the surface of the magnet 430 having the magnetic poles, just like the detect element 338a of the third embodiment.

The detect elements 438a is different from the detect element 338a of the third embodiment (i.e., has two voltage input terminals).

One of the two voltage input terminals of the detect element 438a is connected to the regulator 438d, and the other voltage input terminal thereof is connected to the power storage device 434, and the output terminal thereof is connected to the calculation part 438b, respectively.

The calculation part 438b operates, regardless of ON and OFF of the ignition switch IG4, by receiving a supply of the voltage from the in-vehicle battery B4 via the regulator 438d, and also operates by receiving a supply of the voltage from the power storage device 434, to serve as a function block that calculates and outputs the number of rotations N of the motor 41 based on the detection result of the detect element 438a.

The calculation part 438b is different from the calculation part 338b of the third embodiment (i.e., has two voltage input terminals). One of the two voltage input terminals of the calculation part 438b is connected to the regulator 438d, and the other voltage input terminal of the calculation part 438b) is connected to the power storage device 434, and the input terminal of the calculation part 438b) is connected to the output terminal of the detect element 438a, and the output terminal of the calculation part 438b is connected to the communications part 438c, respectively.

The communications part 438c is the same as the communications part 338c of the third embodiment, and has the same configuration as the third embodiment.

The control unit 432 and the regulator 433 are the same as the control unit 332 and the regulator 333 of the third embodiment, and have the same configuration as the third embodiment.

The power storage device 434 is the same as the power storage device 334 of the third embodiment.

The rotation angle detector 43 is different from the rotation angle detector 33 of the third embodiment (i.e., does not have an element equivalent to the capacitor 335). Therefore, the plus terminal of the power storage device 434 is connected to the detect element 438a and to the other voltage input terminal of the calculation part 438b, and also to the charger 436, and the minus terminal of the power storage device 434 is connected to the ground, which is different from the connection of the power storage device 334 of the third embodiment.

The charger 436 is a function block that is connected to the in-vehicle battery B4, supplies the electric power to the power storage device 434 from the in-vehicle battery B2, and charges the power storage device 434.

The charger 436 has a Zener capacitor 436a, a resistor 436b, a switch 436c, and a control unit 436d. The Zener capacitor 436a, the resistor 436b, the switch 436c, and the control unit 436d are the same as the Zener capacitor 336a, the resistor 336b, the switch 336c, and the control unit 336d of the third embodiment, and have the same configuration as the third embodiment.

Next, with reference to FIG. 12, an operation of the rotation angle detector of the fourth embodiment is described.

Since the operation at a time when the ignition switch is turned ON and the operation at a time when the ignition switch is turned OFF are the same as the third embodiment, description regarding such operations is omitted from the present embodiment.

In the following, the operation at a time when the in-vehicle battery is removed from the vehicle for a replacement is described.

When the in-vehicle battery B4 in FIG. 12 is removed from the vehicle for a replacement, the voltage is no longer supplied to one of the two voltage input terminals on each of the detect element 438a and the calculation part 438b. Therefore, the detect element 438a and the calculation part 438b stop the operation. As a result, the number of rotations N of the motor 41 is not detectable.

However, the rotation angle detector 43 is provided with the power storage device 434 and the charger 436.

The charger 436 operates in the same manner as the charger 336 of the third embodiment. Therefore, the power storage device 434 is sufficiently/fully charged. Further, a run-down/exhaustion of the in-vehicle battery B4 due to the charging of the power storage device 434 is prevented.

The detect element 438a operates by receiving a supply of the voltage to the other voltage input terminal from the power storage device 434, and detects the rotating magnetic field of the magnet 430.

The calculation part 438b operates by receiving a supply of the voltage to the other voltage input terminal from the power storage device 434, and calculates the number of rotations N of the motor 41 based on the detection result of the detect element 438a.

Therefore, even when the steering wheel is steered during a replacement of the in-vehicle battery B4, the number of rotations N of the motor 41 accompanying the steering operation of the steering wheel 140 is securely calculated.

Therefore, when the ignition switch IG4 is turned ON again after a replacement of the in-vehicle battery B4, an accurate steering angle θstr of the steering wheel is detectable.

Next, the effects of the rotation angle detector of the fourth embodiment are described.

According to the fourth embodiment, the same effects as the third embodiment are achieved even though the method of the voltage supply from the power storage device to the detect element is different from the third embodiment.

According to the fourth embodiment, even though two voltage input terminals have to be provided on the detect element 438a and on the calculation part 438b, the capacitor 335 used in the third embodiment is dispensed. Therefore, the number of components is reduced.

In the fourth embodiment, the power storage device 434 gives an example of the storage device having the electric power storage capacity which is required for a replacement of the in-vehicle battery B4 (i.e., for continuously supplying the voltage to the rotation number detection unit 438 for a required period of time for the battery replacement). However, such a configuration may be modified.

The power storage device 434 may have the electric power storage capacity which is required for continuously supplying the voltage to the rotation number detection unit 438 for a preset period of time, even when the voltage of the in-vehicle battery B4 lowers or the voltage supply from the battery B4 is interrupted.

In the fourth embodiment, the rotation angle detection unit 437 gives an example in which the rotation angle detection unit 437 is provided with the calculation part 437b and the communications part 437c. However, such a configuration may be modified.

Figure 13:
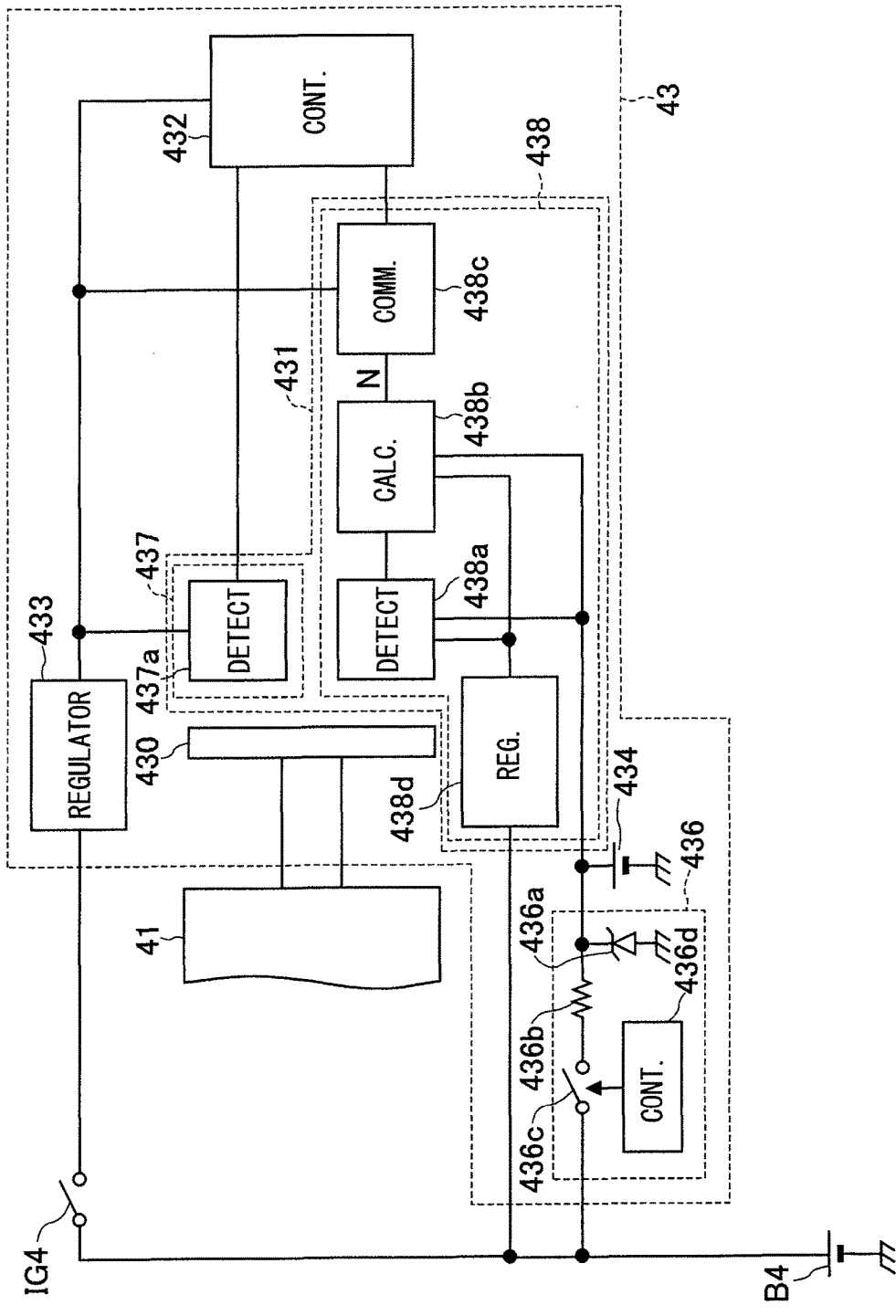
FIG. 13 is a circuit diagram of the rotation angle detector in a modification form of the fourth embodiment.

If the rotation angle θm of the motor 41 is calculable by the control unit 432 based on the detection result of the detect element 437a, the calculation part 437b and the communications part 437c are dispensable as shown in FIG. 13.

In the fourth embodiment, although the power storage device 434 gives an example of a battery, such a configuration may be modified.

Figure 14:
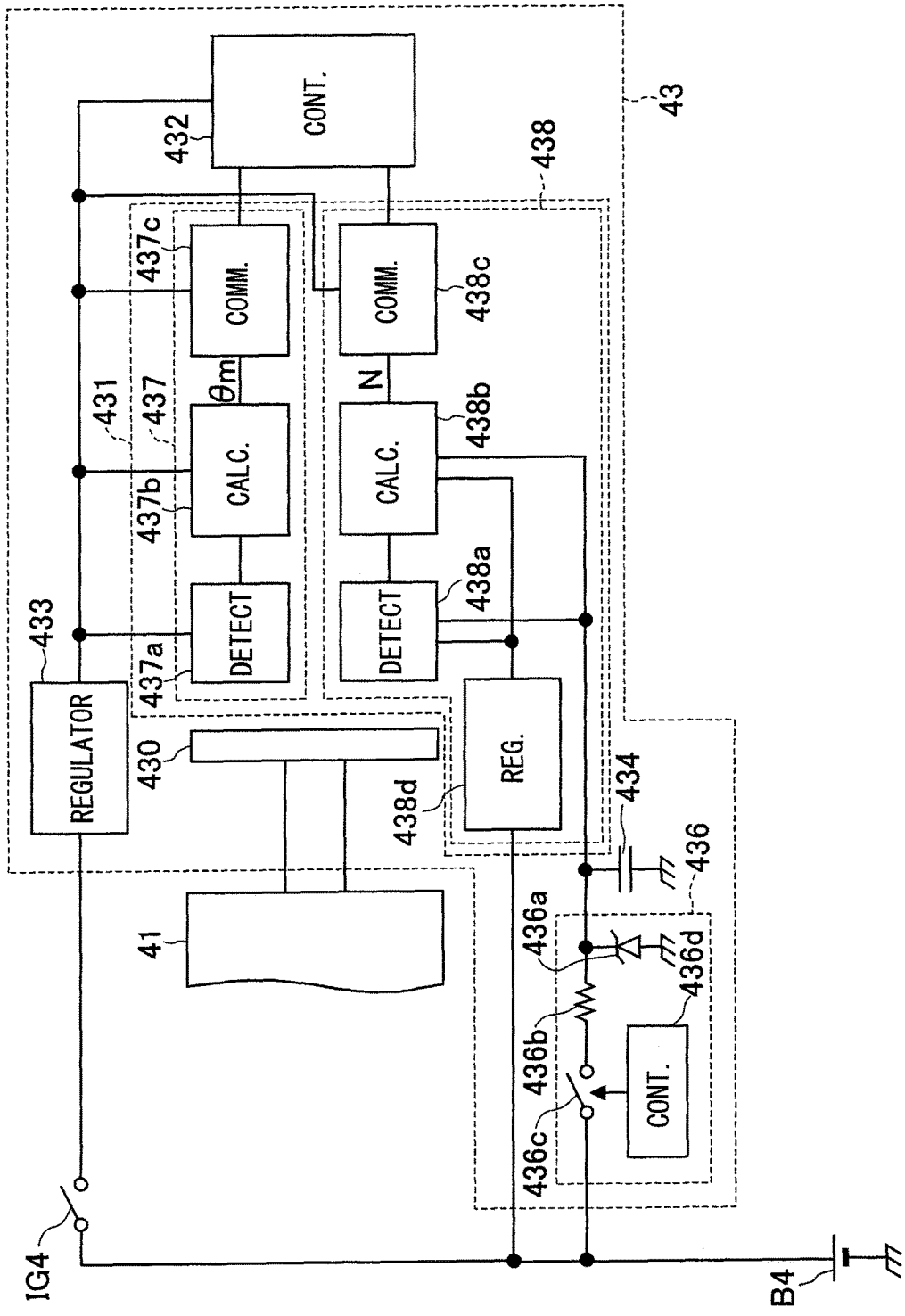
FIG. 14 is a circuit diagram of the rotation angle detector in another modification form of the fourth embodiment.

As shown in FIG. 14, the power storage device 434 may be a capacitor.

Although the rotation angle detector 43 gives an example of the storage device 434 having the charger 436 for charging the power storage device 434 in the fourth embodiment, such a configuration may be modified.

As long as the electric power storage capacity of the power storage device 434 is sufficiently large, the charger 436 is dispensable.

In the fourth embodiment, one power storage device 434 is provided and this one power storage device 434 is used to supply the voltage to both of the detect element 438a and the calculation part 438b. However, such a configuration may be modified.

Figure 15:
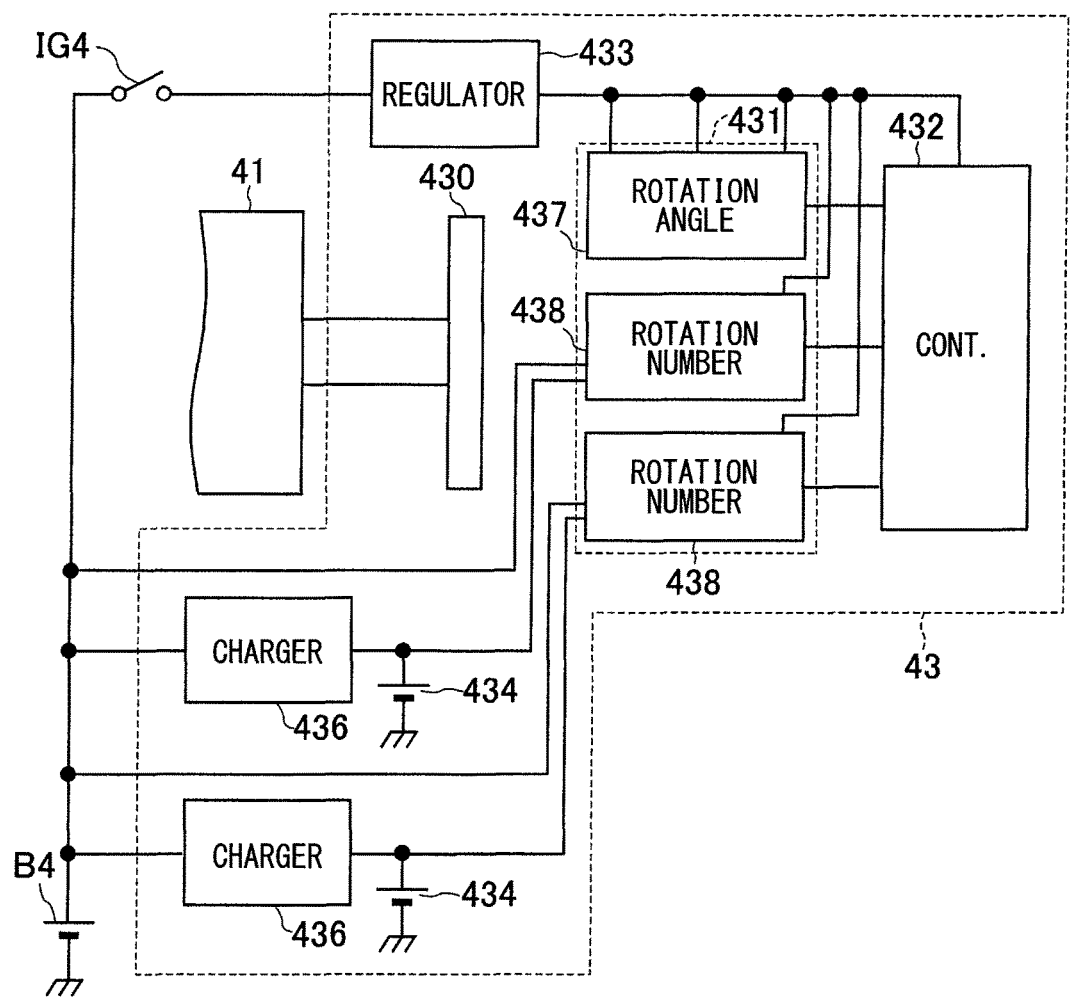
FIG. 15 is a circuit diagram of the rotation angle detector in yet another modification form of the fourth embodiment.

The rotation number detection unit 438 and the power storage device 434 may be provided in two sets as shown in FIG. 15, for the redundancy of the configuration. In such manner, two power storage devices 434 supply the voltage to two rotation number detection units 438, thereby enabling a continuation of the voltage supply from the other (i.e., the second) power storage device 434 to the other (i.e., the second) rotation number detection unit 438 even when the voltage supply from one (i.e., the first) power storage device 434 to one (i.e., the first) rotation number detection unit 438 is interrupted. That is, a redundancy (for a contingency situation) is provided in such manner.

Further, the rotation number detection unit 438 and the power storage device 434 may be provided in three sets or more. That is, by providing plural sets of the rotation number detection unit 438 and the power storage device 434, the redundancy of the rotation angle detector 43 is improved.

Although the present disclosure has been described in connection with preferred embodiment thereof with reference to the accompanying drawings, it is to be noted that various changes and modifications become apparent to those skilled in the art, and such changes, modifications, and summarized schemes are to be understood as being within the scope of the present disclosure as defined by appended claims.

What is claimed is:

1. An apparatus for detecting rotation angle of an electric power steering motor of a vehicle, comprising:
    a rotation sensor configured to detect rotation of the motor and to receive a supply of voltage from a first chargeable power source;
    a second chargeable power source disposed separately from the first chargeable power source and configured to supply voltage to the rotation sensor; and
    a charger configured (i) to supply an electric power from the first chargeable power source to the second chargeable power source to charge the second chargeable power source, and (ii) to control whether to charge the second chargeable power source, wherein
    the second chargeable power source supplies voltage to the rotation sensor, regardless of whether the first chargeable power source is supplying voltage to the rotation sensor, and
    the charger is further configured to charge the second chargeable power source in response to an alternator charging the first chargeable power source.

2. The apparatus of claim 1, wherein the rotation sensor includes:
    a rotation angle sensor configured (i) to receive a supply of voltage from the first chargeable power source when a power switch is turned ON, and (ii) to detect (a) the rotation angle of the motor or (b) information corresponding to the rotation angle of the motor; and
    a rotation number sensor configured (i) to receive a supply of voltage from the first chargeable power source regardless of an ON position or an OFF position of the power switch, and (ii) to detect the number of rotations of the motor, wherein
    the second chargeable power source is further configured to supply voltage to the rotation number sensor.

3. The apparatus of claim 1, wherein
    the second chargeable power source includes a plurality of power sources, each of the plurality of power sources configured to supply the rotation sensor with voltage.

4. The apparatus of claim 1, wherein
    the second chargeable power source is a battery or a capacitor.

5. The apparatus of claim 1, wherein
    the motor is configured to rotate a rotation object that is a part of a steering system.

6. The apparatus of claim 1, further comprising a controller configured to control the charger to supply electric power from the first chargeable power source to the second chargeable power source, the controller connected to a switchable supply of electric power, wherein
    the controller controls the charger to supply electric power from the first chargeable power source to the second chargeable power source in response to receiving electric power from the switchable supply of electric power.

7. The apparatus of claim 1, wherein
    the apparatus is configured to operate in an electric power steering device of a vehicle.

8. The apparatus of claim 7, wherein
    the charger is further configured to refrain from charging the second chargeable power source in response to the alternator not charging the first chargeable power source.

9. The apparatus of claim 1, wherein the second chargeable power source has an electric power storage capacity configured to supply the continuous voltage to the rotation sensor for a preset time period, when the voltage of the first chargeable power source lowers, or the voltage supply from the first chargeable power source is interrupted.

10. The apparatus of claim 9, wherein
    the electric power storage capacity of the second chargeable power source is configured to enable a continuous voltage supply to the rotation sensor for a required time period that is required for a replacement of the first chargeable power source.

11. The apparatus of claim 1, wherein the charger comprises a switch between the first chargeable power source and the second chargeable power source, the switch controlling the supply of electric power from the first chargeable power source to the second chargeable power source.

12. The apparatus of claim 11, further comprising a controller, the controller receiving a supply of electric power from the first chargeable power source when a power switch between the first chargeable power source and the controller is ON, wherein the controller controls the switch of the charger such that the switch is ON when the power switch is ON.

13. A steering system, comprising: a rotation angle detector, the rotation angle detector having: a rotation sensor configured to detect (i) a rotation angle of the motor and (ii) a number of rotations of the motor, the rotation sensor configured to receive a supply of voltage from a first chargeable power source; a second chargeable power source disposed separately from the first chargeable power source and configured to supply voltage to the rotation sensor; and a charger configured (i) to supply an electric power from the first chargeable power source to the second chargeable power source to charge the second chargeable power source, and (ii) to control whether to charge the second chargeable power source, wherein the second chargeable power source supplies voltage to the rotation sensor, regardless of whether the first chargeable power source is supplying voltage to the rotation sensor, and the charger is further configured to charge the second chargeable power source in response to an alternator charging the first chargeable power source.

14. An apparatus for detecting rotation angle of an electric power steering motor of a vehicle, comprising: a rotation sensor configured to detect rotation of the motor and to receive a supply of voltage from a first chargeable power source, the rotation sensor including: a rotation angle sensor configured (i) to receive a supply of voltage from the first chargeable power source when a power switch is turned ON, and (ii) to detect (a) therotation angle of the motor or (b) information corresponding to the rotation angle of the motor; and a rotation number sensor configured (i) to receive a supply of voltage from the first chargeable power source regardless of an ON position or an OFF position of the power switch, and (ii) to detect the number of rotations of the motor; a second chargeable power source disposed separately from the first chargeable power source and configured to supply voltage to the rotation sensor; and a charger configured (i) to supply an electric power from the first chargeable power source to the second chargeable power source to charge the second chargeable power source, and (ii) to control whether to charge the second chargeable power source, the charger further configured to charge the second chargeable power source in response to an alternator charging the first chargeable power source, wherein the second chargeable power source supplies voltage to the rotation sensor, regardless of whether the first chargeable power source is supplying voltage to the rotation sensor, the second chargeable power source is further configured to supply voltage to the rotation number sensor, the second chargeable power source has an electric power storage capacity configured to supply the continuous voltage to the rotation sensor for a preset time period, when the voltage of the first chargeable power source lowers, or the voltage supply from the first chargeable power source is interrupted, the electric power storage capacity of the second chargeable power source is configured to enable a continuous voltage supply to the rotation sensor for a required time period that is required for a replacement of the first chargeable power source, the second chargeable power source includes a plurality of power sources, each of the plurality of power sources configured to supply the rotation sensor with voltage, and the second chargeable power source includes a battery or a capacitor.

* * * * *